United States Patent [19]

Shiff

[11] 4,112,261
[45] Sep. 5, 1978

[54] KEY TELEPHONE SYSTEM AND METHOD
[75] Inventor: Milo B. Shiff, Yorba Linda, Calif.
[73] Assignee: The Anaconda Company, New York, N.Y.
[21] Appl. No.: 797,490
[22] Filed: May 16, 1977
[51] Int. Cl.² .............................................. H04M 1/00
[52] U.S. Cl. ..................................... 179/99; 179/18 J
[58] Field of Search .................. 179/99, 18 J, 15 AT, 179/15 AL, 15 AW, 18 F, 18 FA, 185

[56] References Cited

U.S. PATENT DOCUMENTS

| | | | |
|---|---|---|---|
| 3,701,854 | 10/1972 | Anderson et al. | 179/99 |
| 3,701,855 | 10/1972 | Reynolds | 179/99 |
| 3,843,845 | 10/1974 | Ridley | 179/99 |
| 3,935,396 | 1/1976 | Barsellotti et al. | 179/99 |
| 3,973,085 | 8/1976 | Shiff | 179/99 |
| 4,061,887 | 12/1977 | Kasson et al. | 179/99 |

Primary Examiner—Kathleen H. Claffy
Assistant Examiner—Gerald L. Brigance
Attorney, Agent, or Firm—William W. Haefliger

[57] ABSTRACT

An improved key telephone system realizes substantial reduction in installation costs, permits use of relatively small central units, provides compatability with telephone apparatus speaker phones, automatic dialers, etc., and provides additional advantages. The system basically embodies:

(a) multiple adapter units each connected with and proximate to a station set,
(b) multiple supervisory circuits to each of which at least two of said adapter units are connected via a talk pair and a control pair, said circuits being remote from said adapters,
(c) system control means connected with said supervisory circuits via a data control bus for asynchronously transmitting to each adapter unit, via said supervisory circuits, data including a start pulse causing the adapter to poll the line select and other switches in the station sets, and return the results of said polling to the system control means via the supervisory circuit in the form of a data word, following which the system control means transmits a data word corresponding to light, bell ringing or intercom bell ringing information.

12 Claims, 41 Drawing Figures

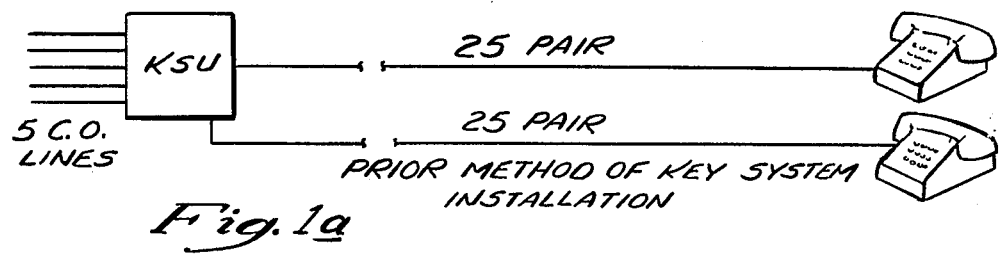
Fig. 1a PRIOR METHOD OF KEY SYSTEM INSTALLATION
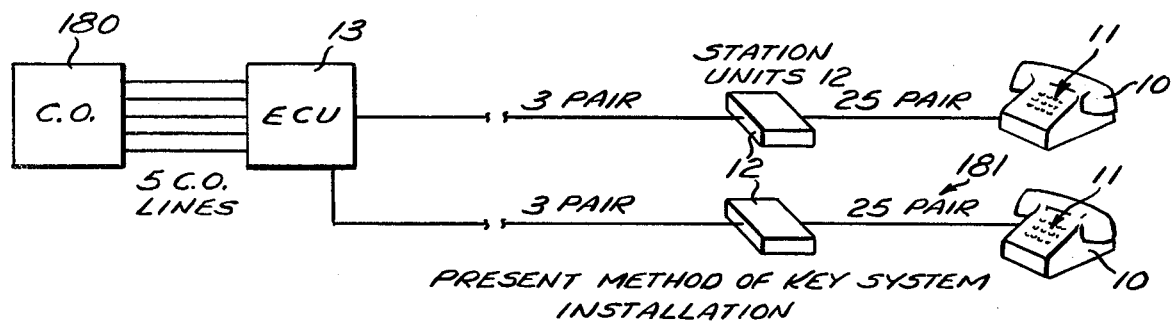
Fig. 1b PRESENT METHOD OF KEY SYSTEM INSTALLATION
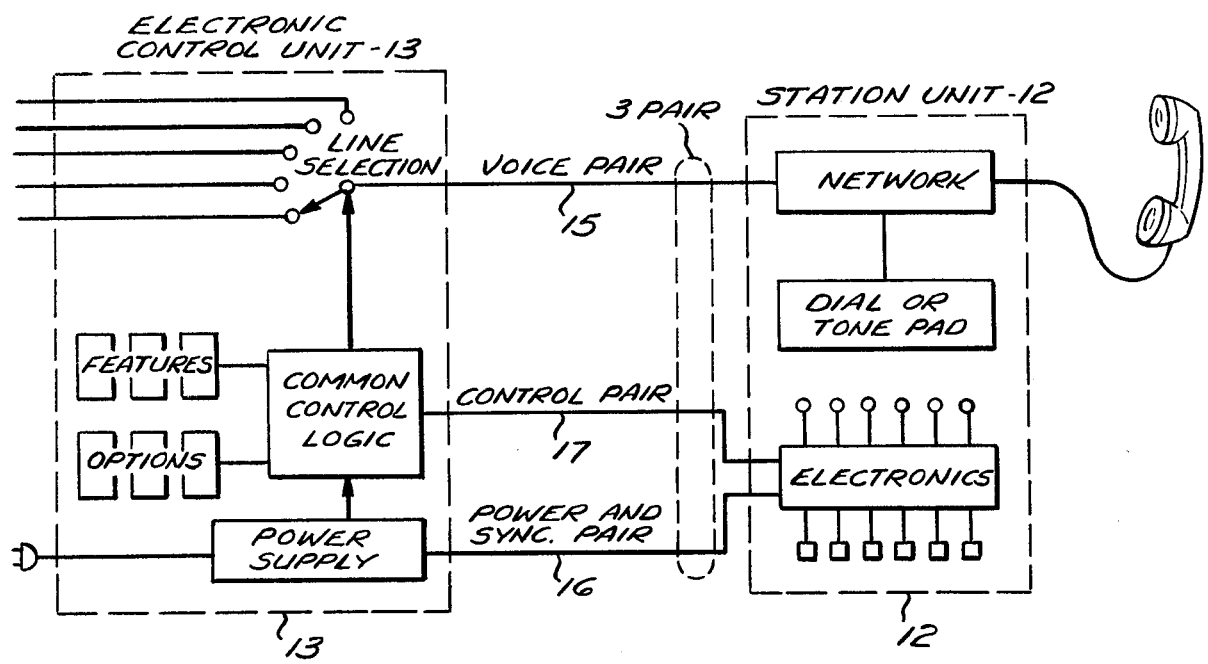
Fig. 2

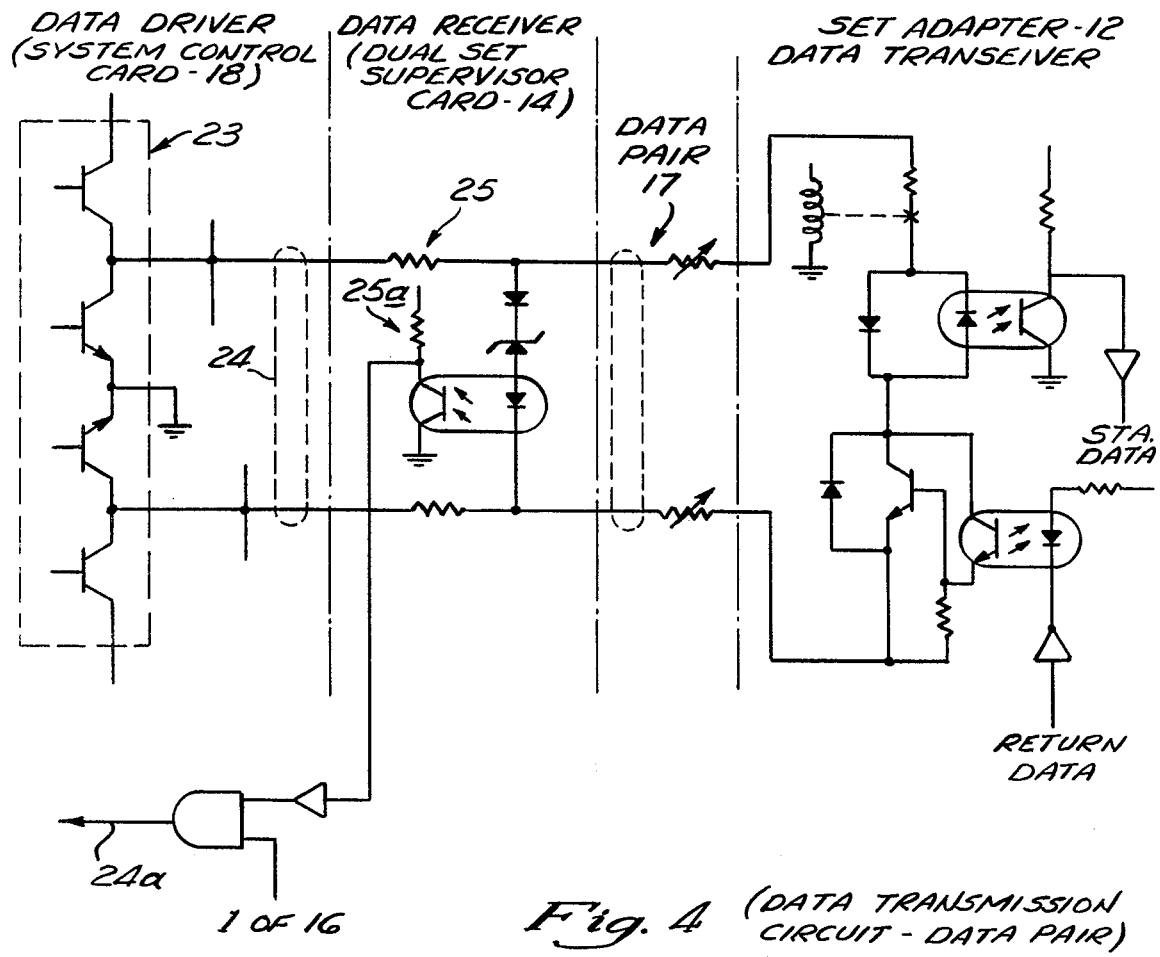
Fig. 4 (DATA TRANSMISSION CIRCUIT - DATA PAIR)
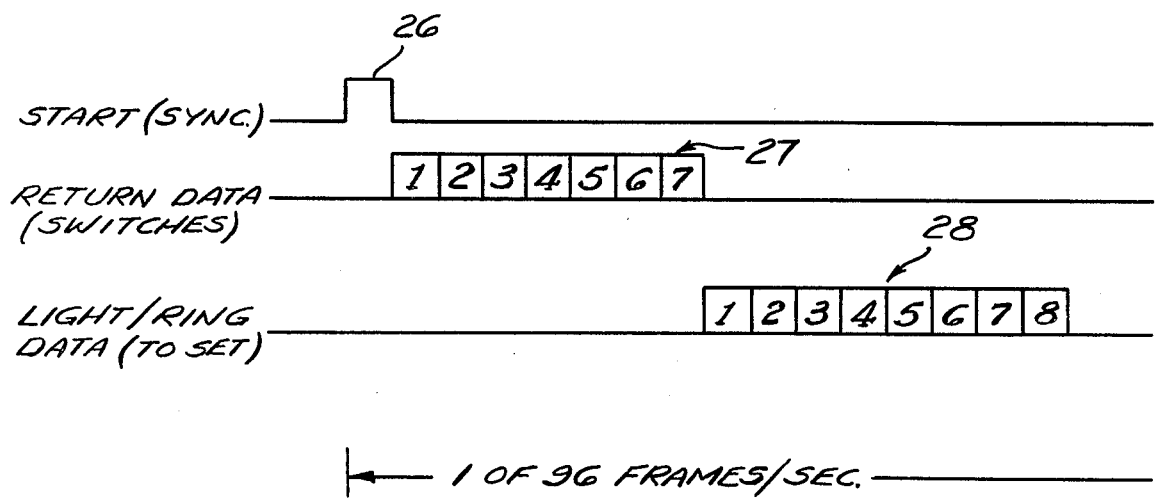
Fig. 5 (DATA FORMAT)

| STATION RING CODES | | | | | | | | | | |
|---|---|---|---|---|---|---|---|---|---|---|
| | LINES | | | | | INTERCOM | | | | NITE | |
| | 1 | 2 | 3 | 4 | 5 | 6 | 7 | 8 | 9 | 10 | DIALED NO. |
| LINE 1 | ON |  |  |  |  | ON | ON | ON |  |  | 3 |
| LINE 2 |  | ON |  |  |  |  | ON | ON |  |  | 4 |
| LINE 3 |  |  | ON |  |  |  | ON | ON |  |  | 5 |
| LINE 4 |  |  |  | ON |  |  | ON | ON |  |  | 6 |
| LINE 5 |  |  |  |  | ON | ON | ON |  |  |  | 7 |
| NITE ANS. |  |  |  |  |  |  | ON |  |  | ON | 8 |
|  |  |  |  |  |  |  | ON |  |  |  | 9 |
|  |  |  |  |  |  |  |  |  |  |  | 0 |
|  |  |  |  |  |  |  | ON | ON |  |  | 21 |
|  |  |  |  |  |  | ON |  | ON |  |  | 22 |
|  |  |  |  |  |  | ON | ON |  |  |  | 23 |
|  |  |  |  |  |  | ON | ON | ON |  |  | 24 |
|  |  |  |  |  |  |  |  | ON | ON |  | 25 |
|  |  |  |  |  |  |  | ON |  | ON |  | 26 |
|  |  |  |  |  |  |  | ON | ON | ON |  | 27 |
|  |  |  |  |  |  | ON | ON | ON | ON |  | 28 |

▨ ON  ☐ OFF

NOTE: LINE SWITCHES MAY BE SELECTED IN ANY COMBINATION.

Fig. 6 (BELL CONTROL SWITCHES)

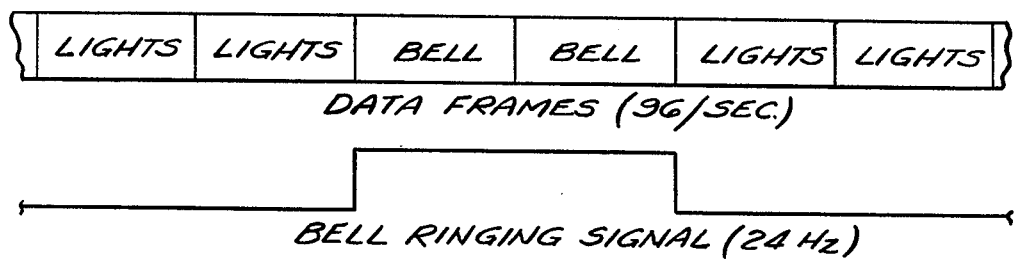

| LIGHTS | LIGHTS | BELL | BELL | LIGHTS | LIGHTS |

DATA FRAMES (96/SEC.)

BELL RINGING SIGNAL (24 Hz)

Fig. 7 (DATA TRANSMISSION LIGHT/BELL INFORMATION)

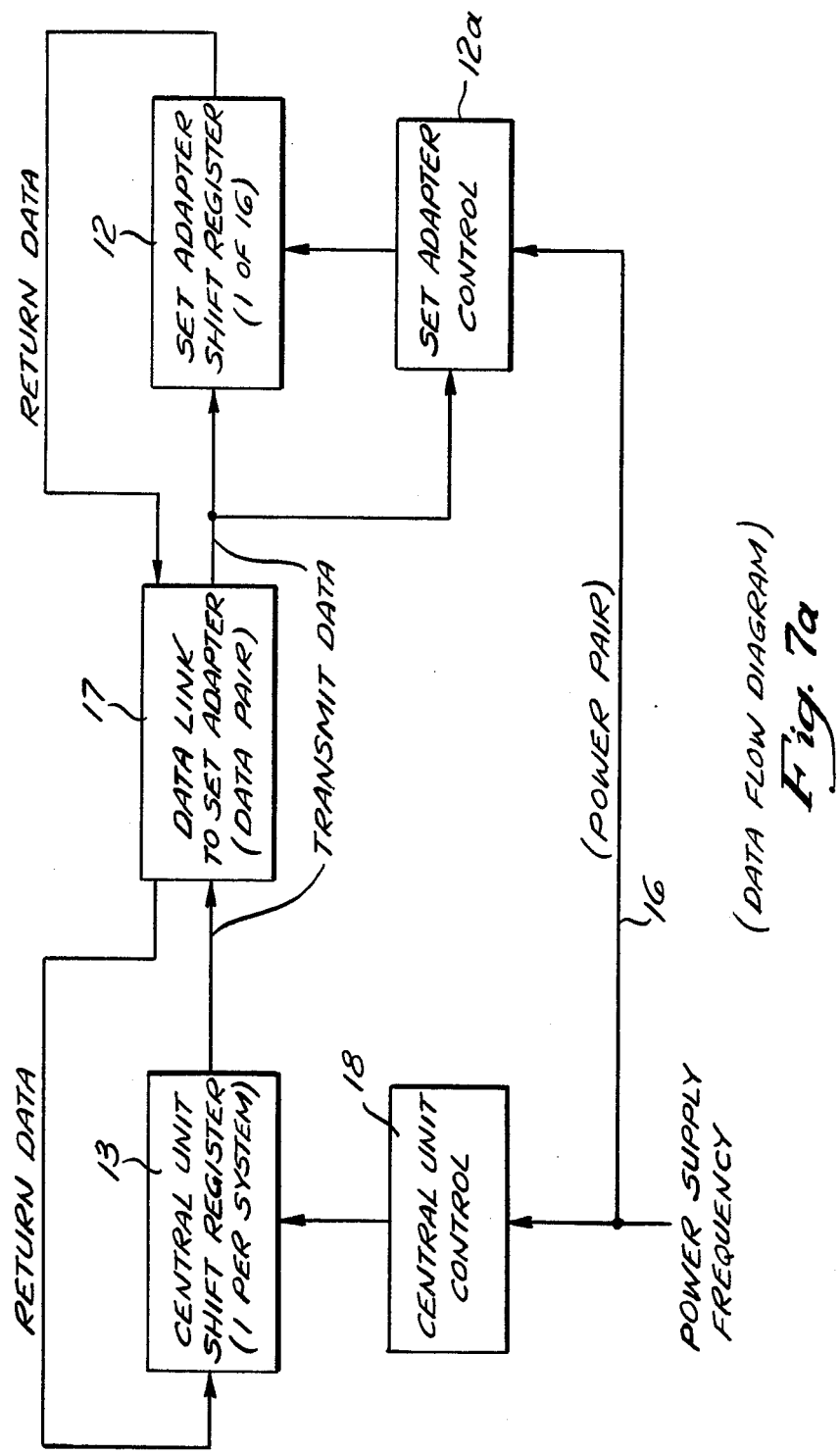
Fig. 7a (DATA FLOW DIAGRAM)

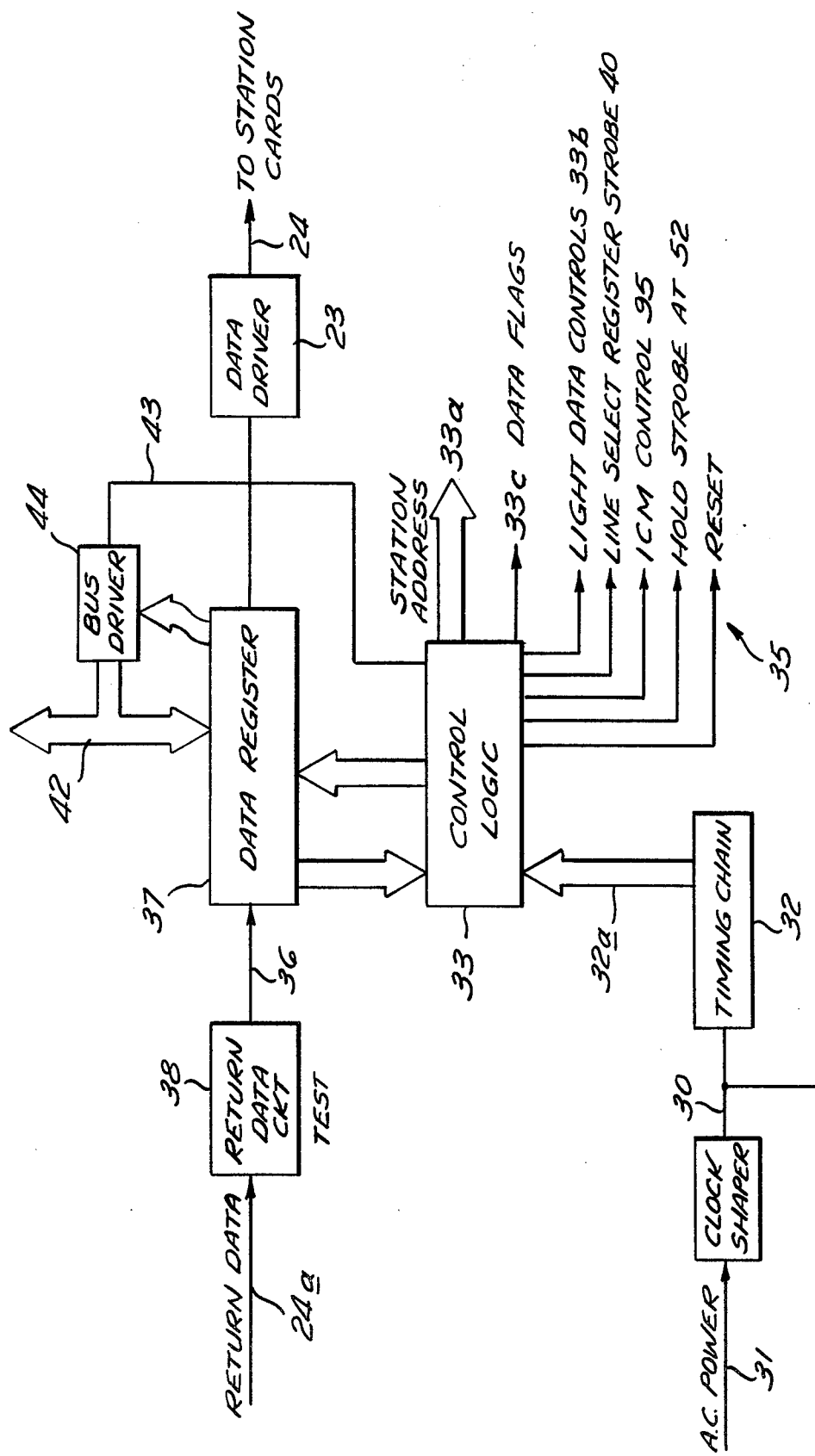
Fig. 8 (COMMON CONTROL CARD)

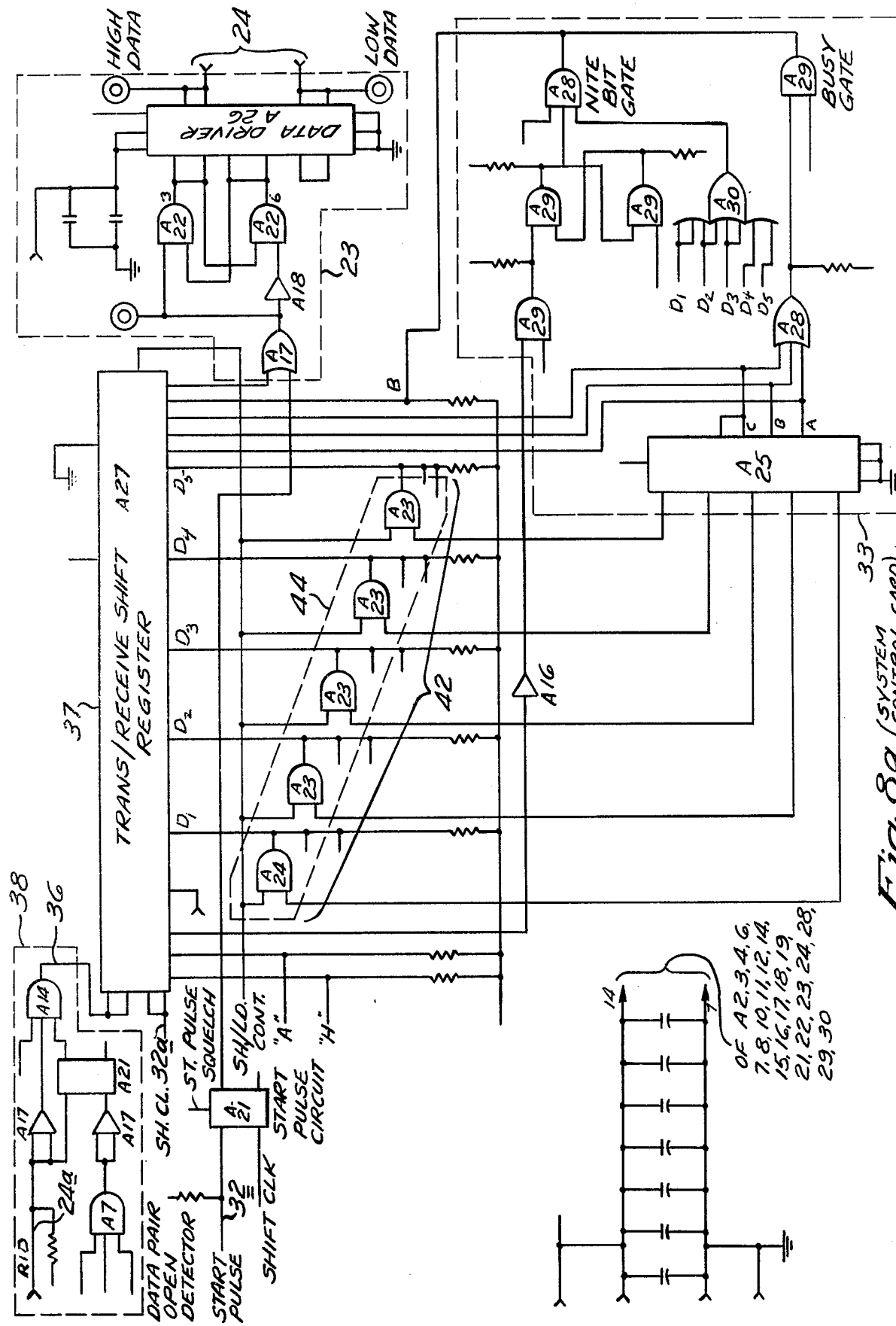
Fig. 8a (SYSTEM CONTROL CARD)

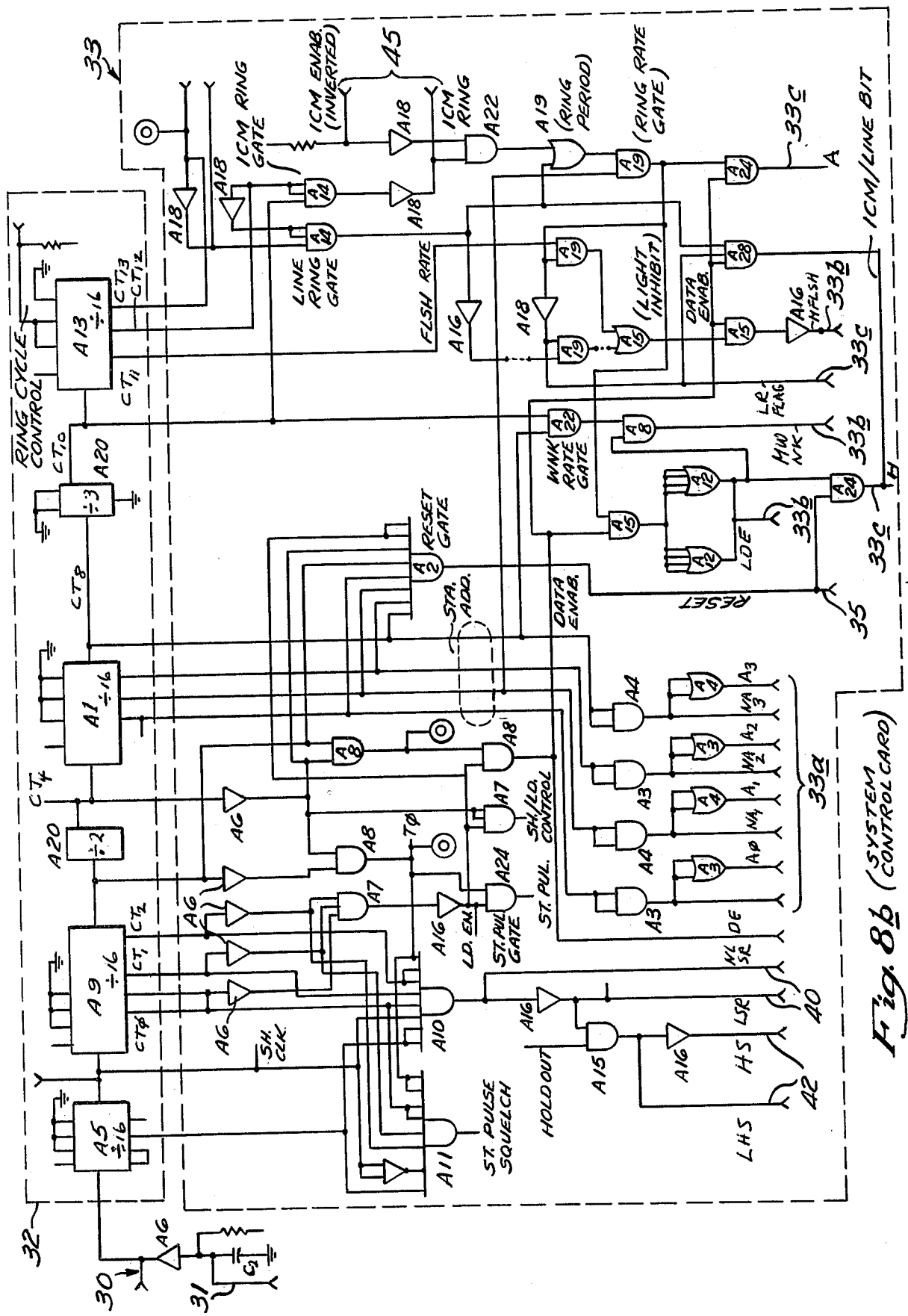
Fig. 8b (SYSTEM CONTROL CARD)

STATION DATA GENERAL FORMAT

| 1 | 2 | 3 | 4 | 5 | 6 | 7 | 8 |
|---|---|---|---|---|---|---|---|
| SYNC | | | DATA FIELD | | | BUSY | LIGHTS/RING |
| ICM/LINE | | | | | | NITE | |

LIGHTS

| 1 | 2 | 3 | 4 | 5 | 6 | 7 | 8 |
|---|---|---|---|---|---|---|---|
| SYNC | 5 | 4 | 3 | 2 | 1 | BUSY | 1 |
| | LIGHT DATA | | | | | | |

LINE RING

| 1 | 2 | 3 | 4 | 5 | 6 | 7 | 8 |
|---|---|---|---|---|---|---|---|
| 0 | 5 | 4 | 3 | 2 | 1 | NITE | 0 |
| | LINE RING DATA | | | | | | |

ICM RING

| 1 | 2 | 3 | 4 | 5 | 6 | 7 | 8 |
|---|---|---|---|---|---|---|---|
| 1 | ICM/PAGE | BIT 3 | BIT 2 | BIT 1 | BIT 0 | — | 0 |
| | | ICM RING DATA | | | | | |

RETURN DATA FORMAT

| 1 | 2 | 3 | 4 | 5 | 6 | 7 |
|---|---|---|---|---|---|---|
| PURL | NITE | SPARE | A2 | A1 | A0 | HOLD |
| | | | LINE SELECT DATA | | | |

(DATA FORMATS) Fig. 8c

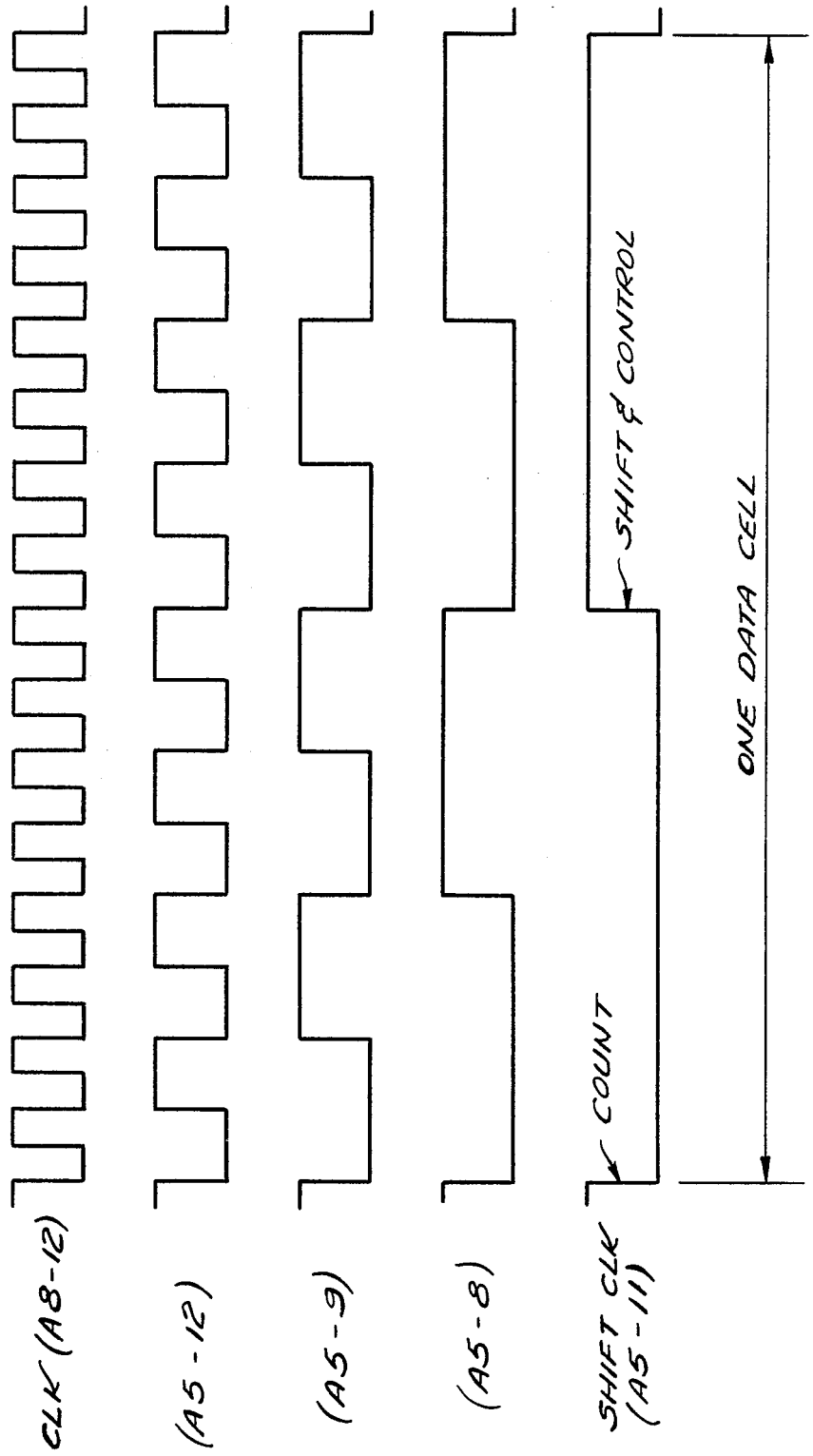

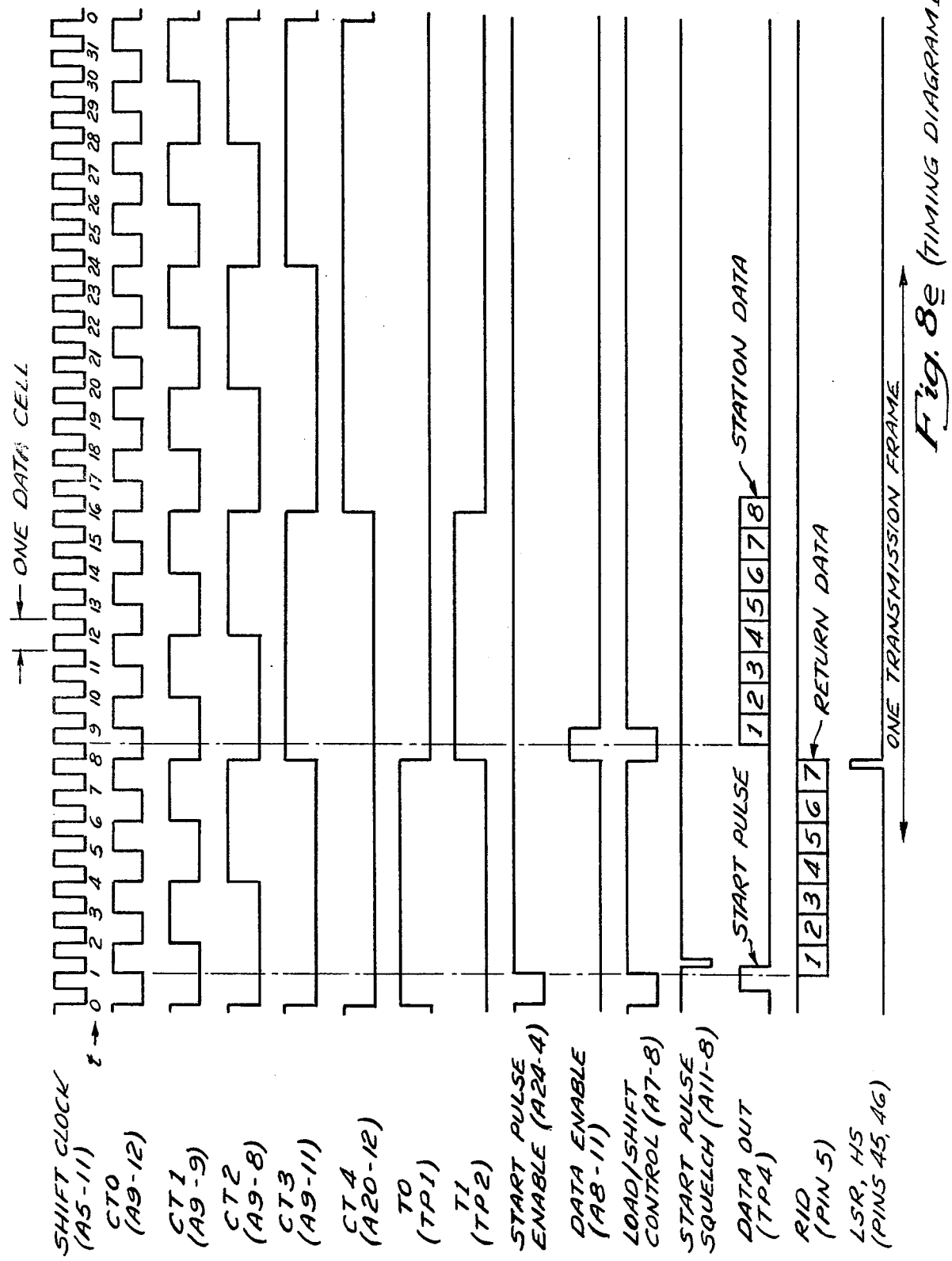

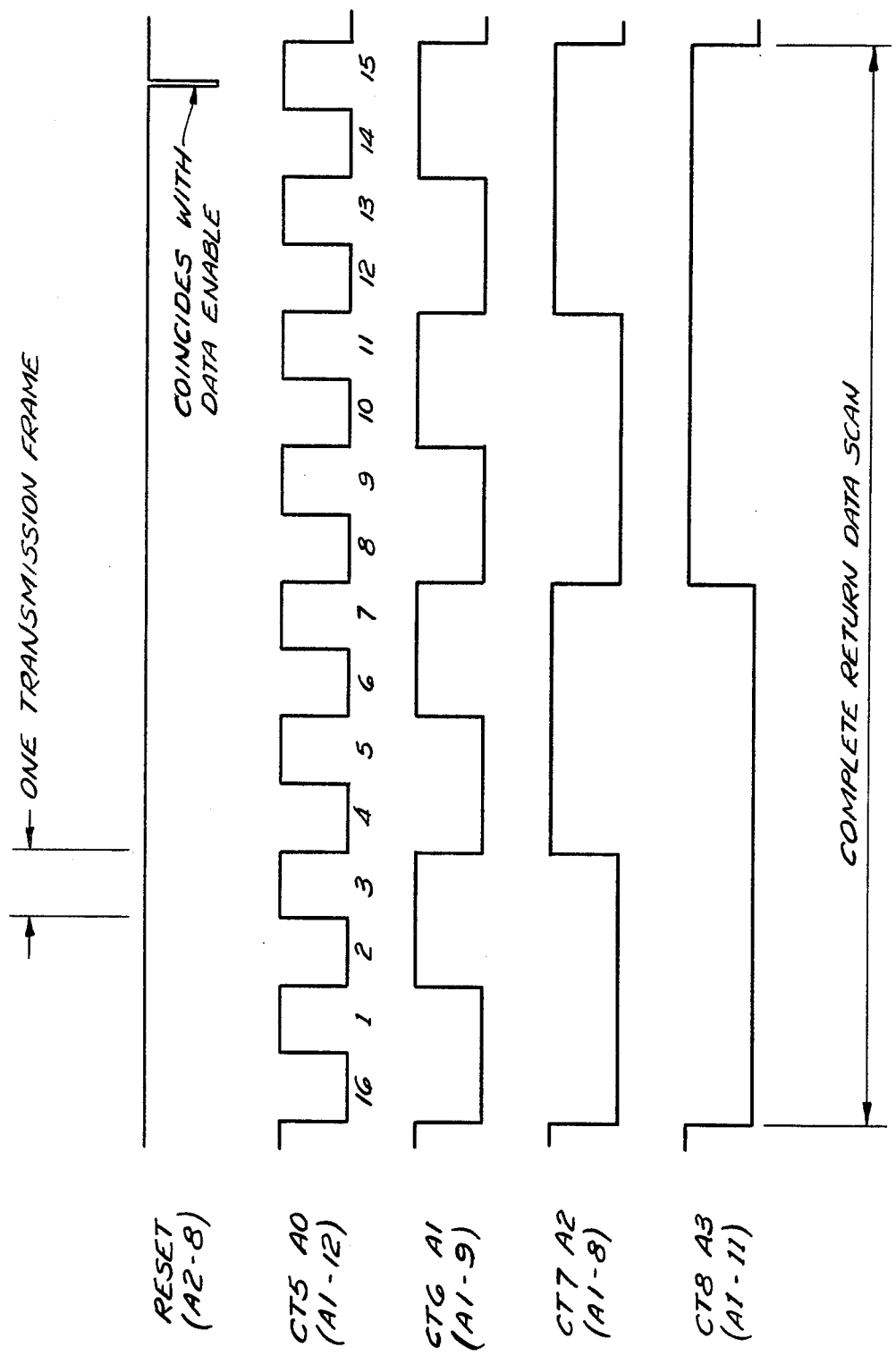
Fig. 8f (TIMING DIAGRAM III)

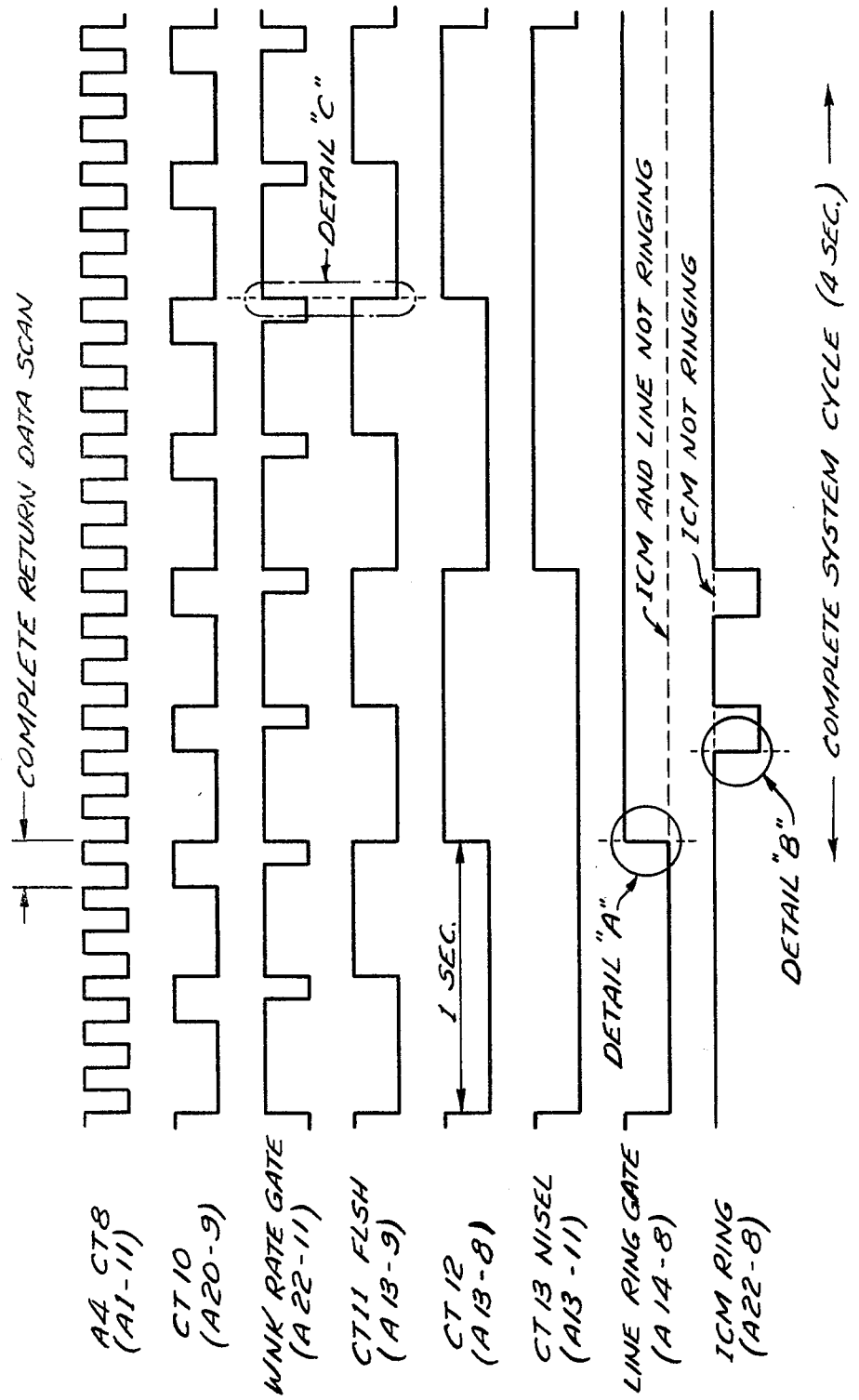

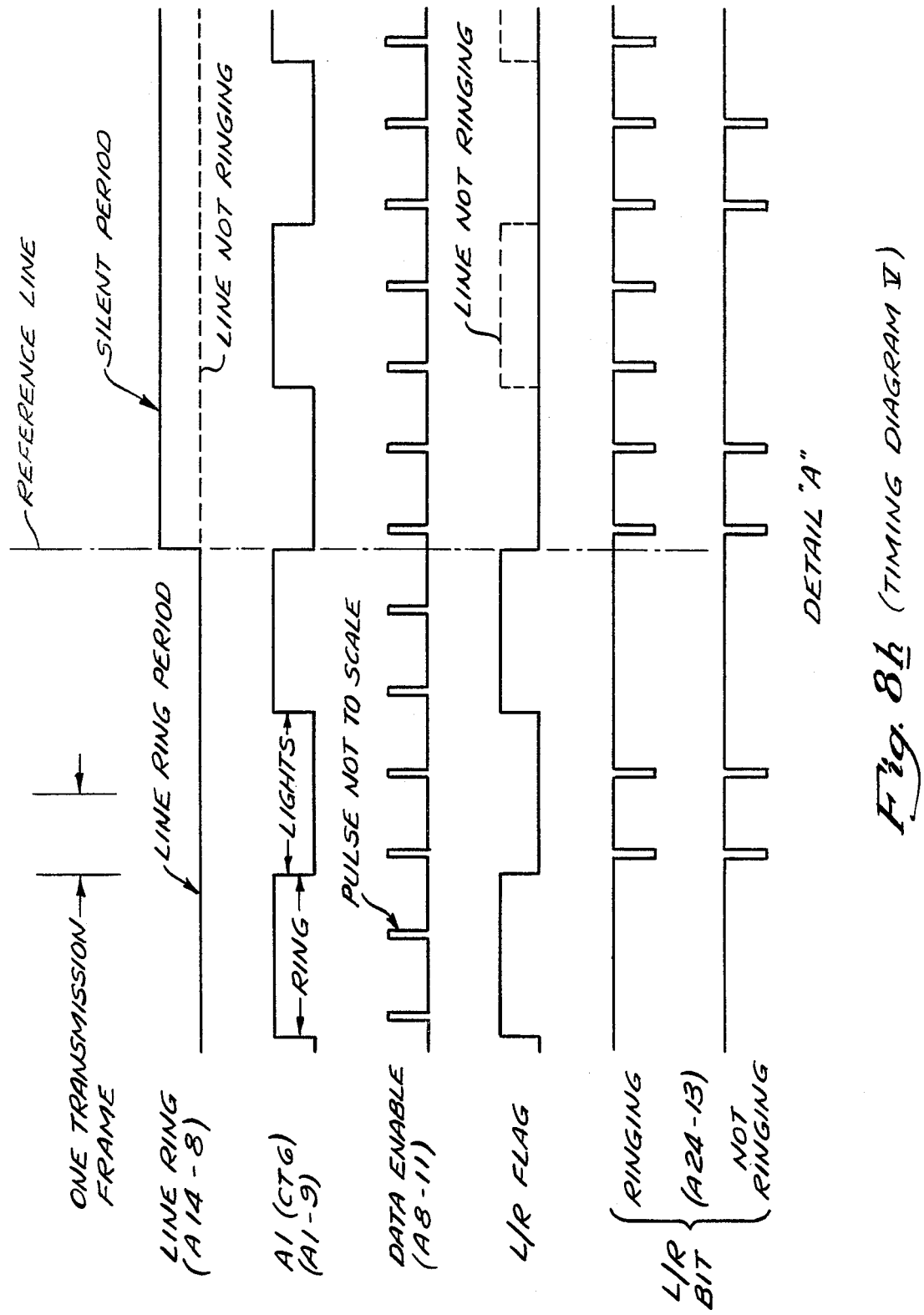
Fig. 8h (TIMING DIAGRAM V)

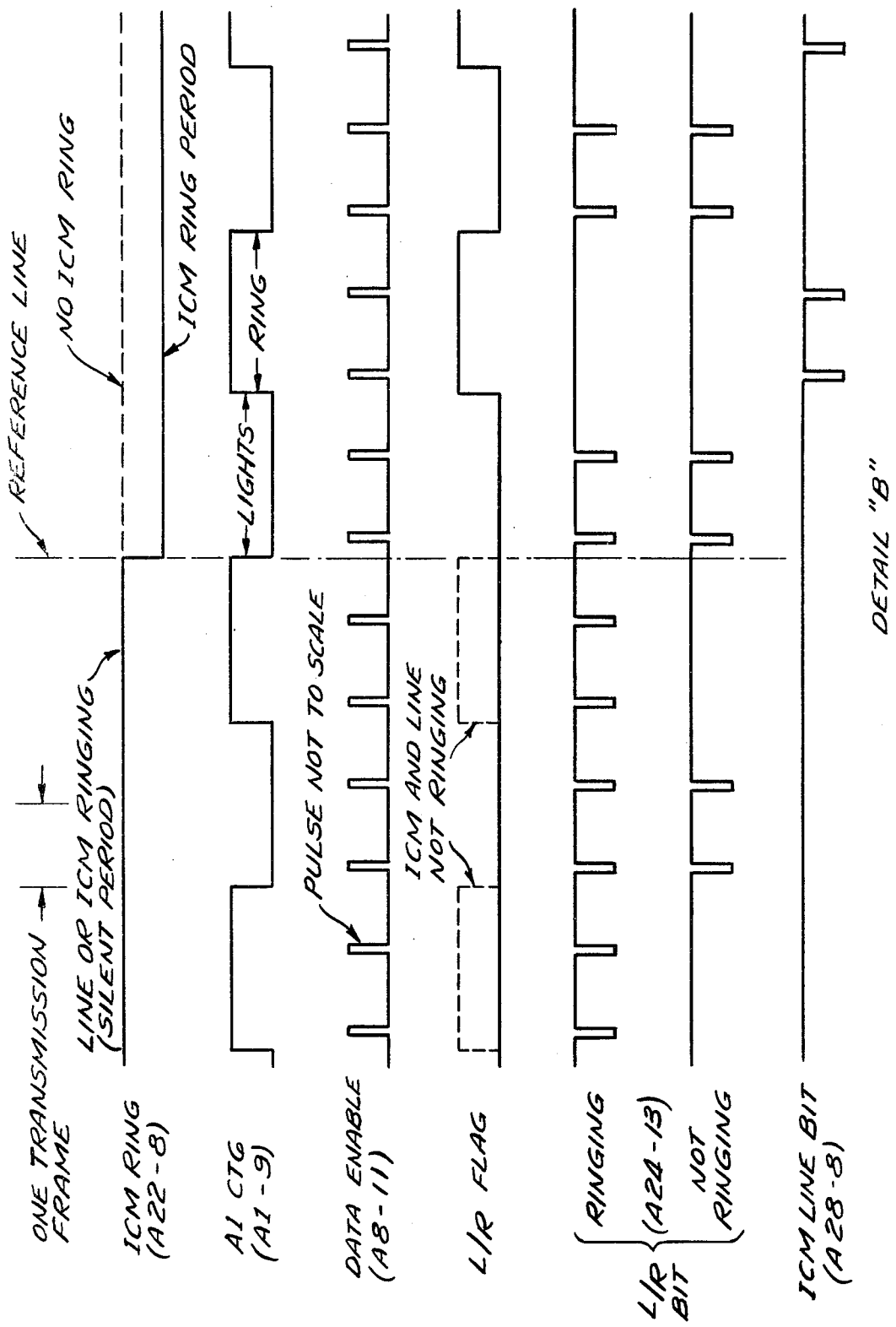

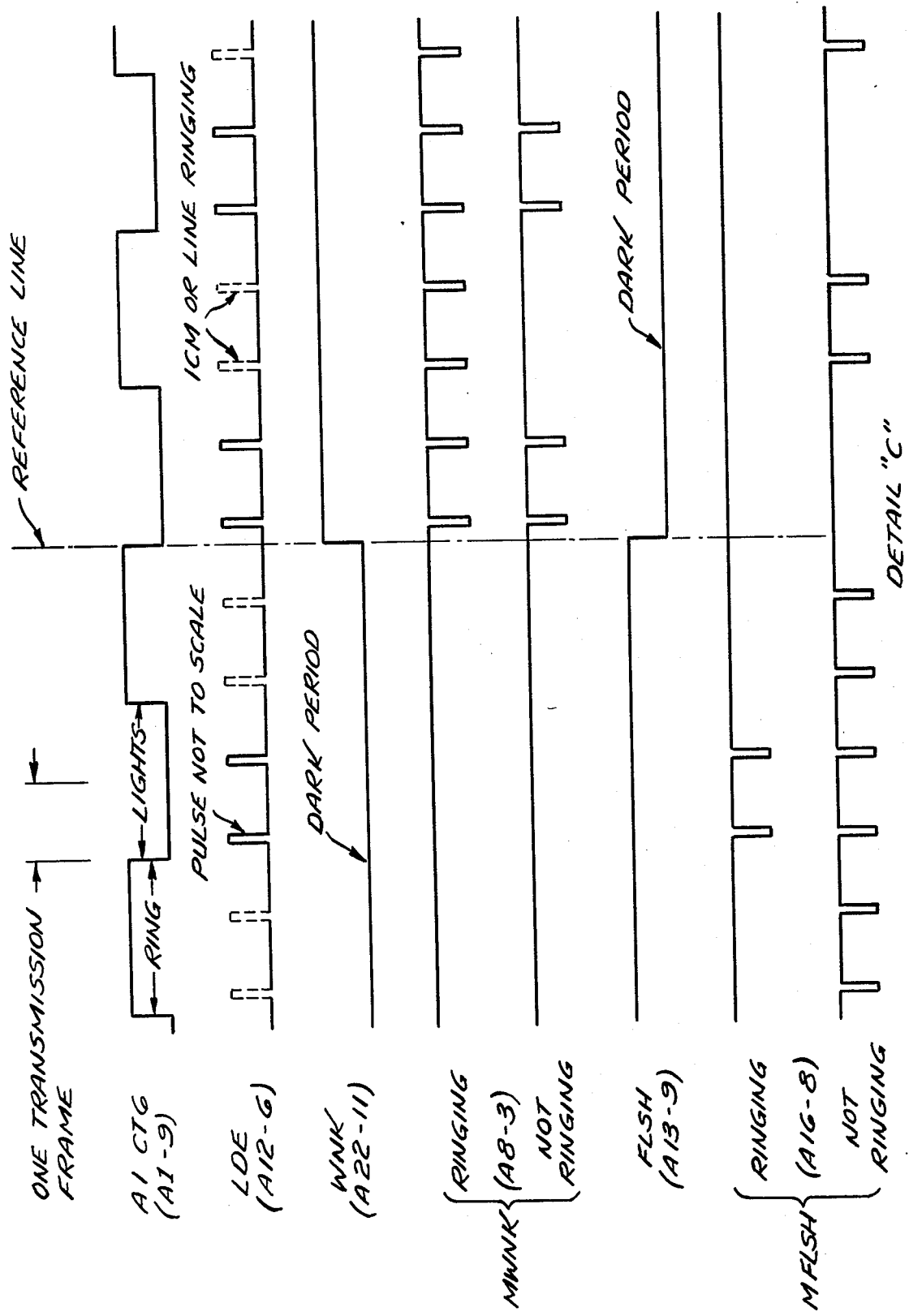
Fig. 8j (TIMING DIAGRAM VII)

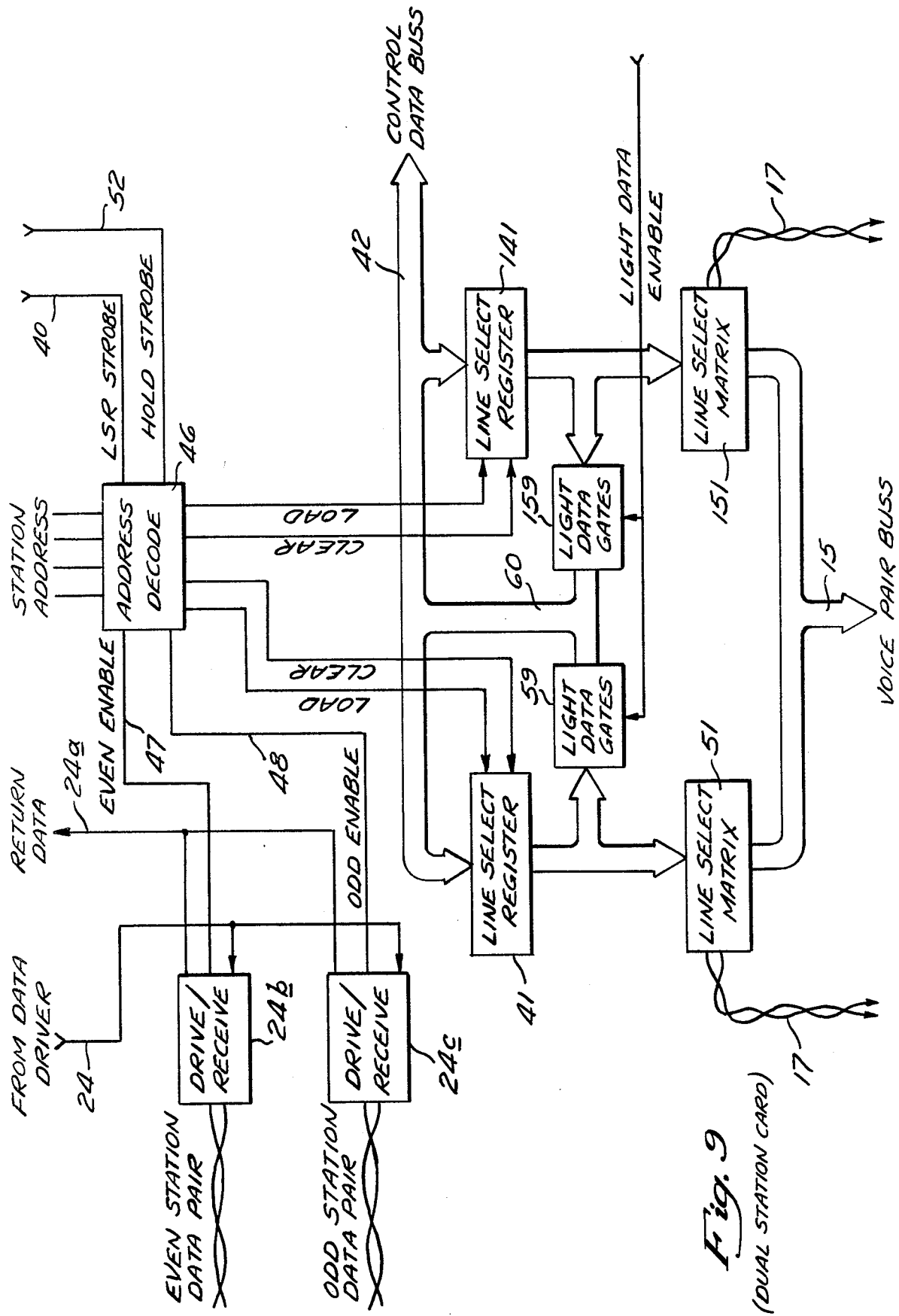
Fig. 9 (DUAL STATION CARD)

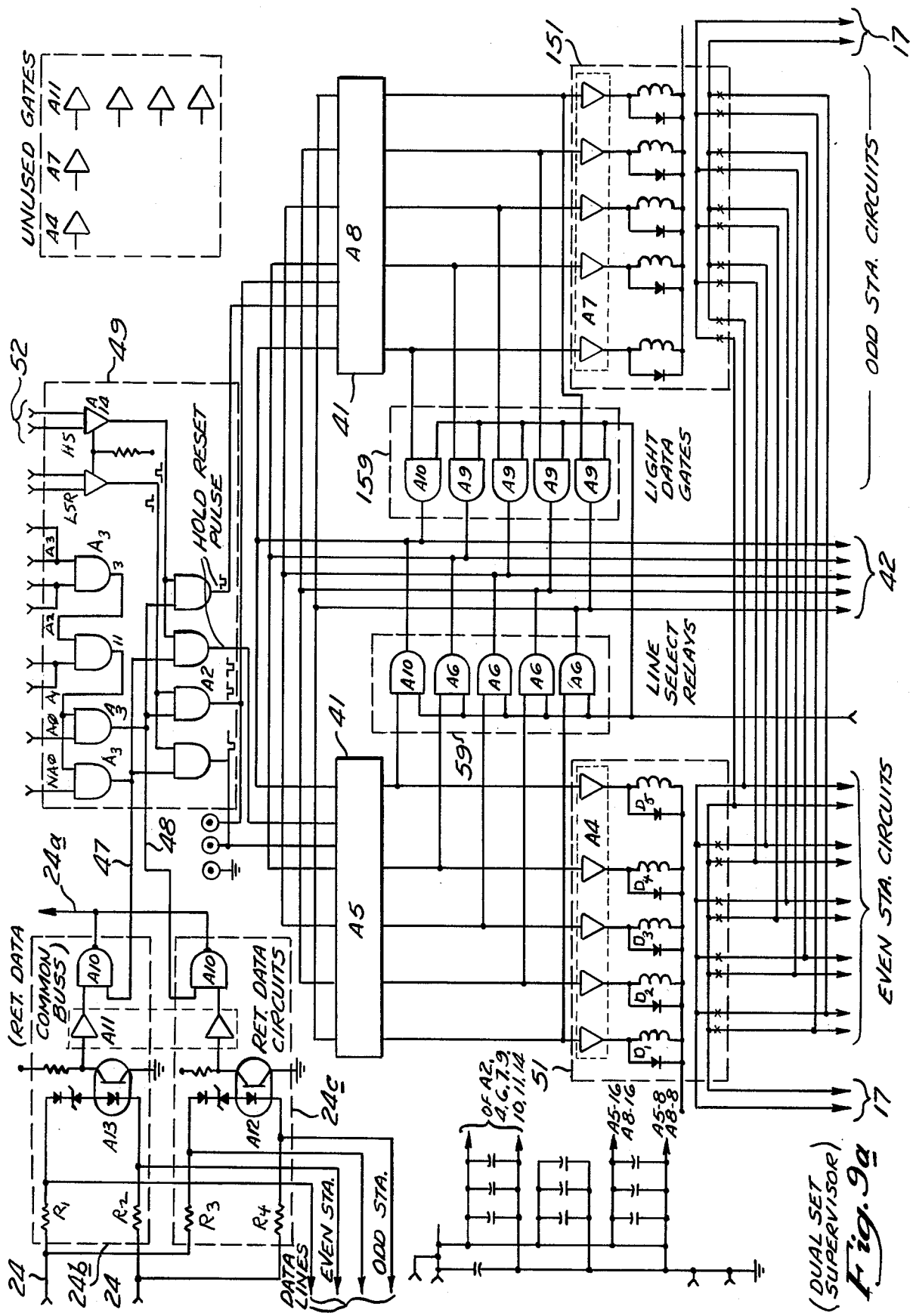

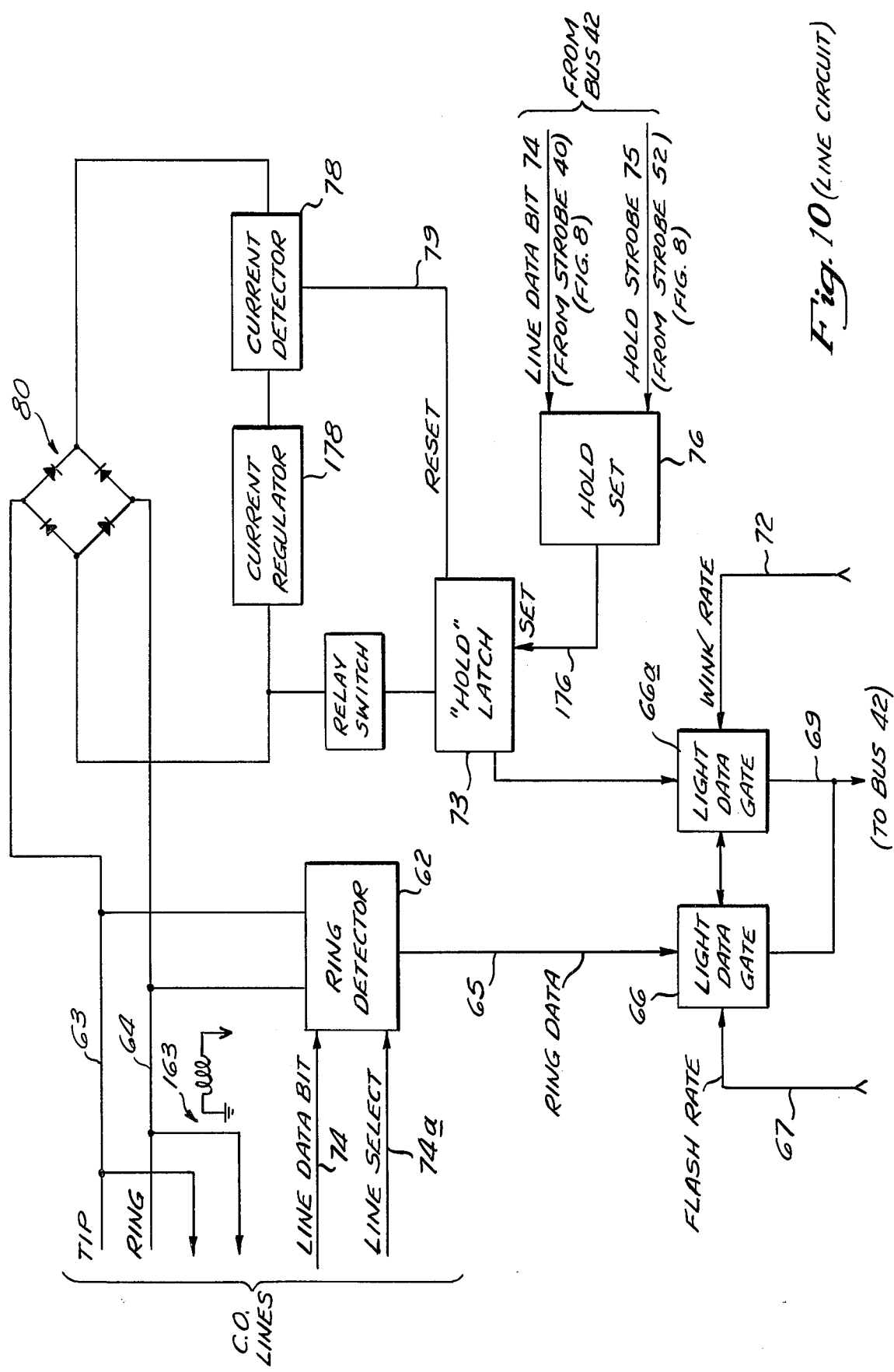
Fig. 10 (LINE CIRCUIT)

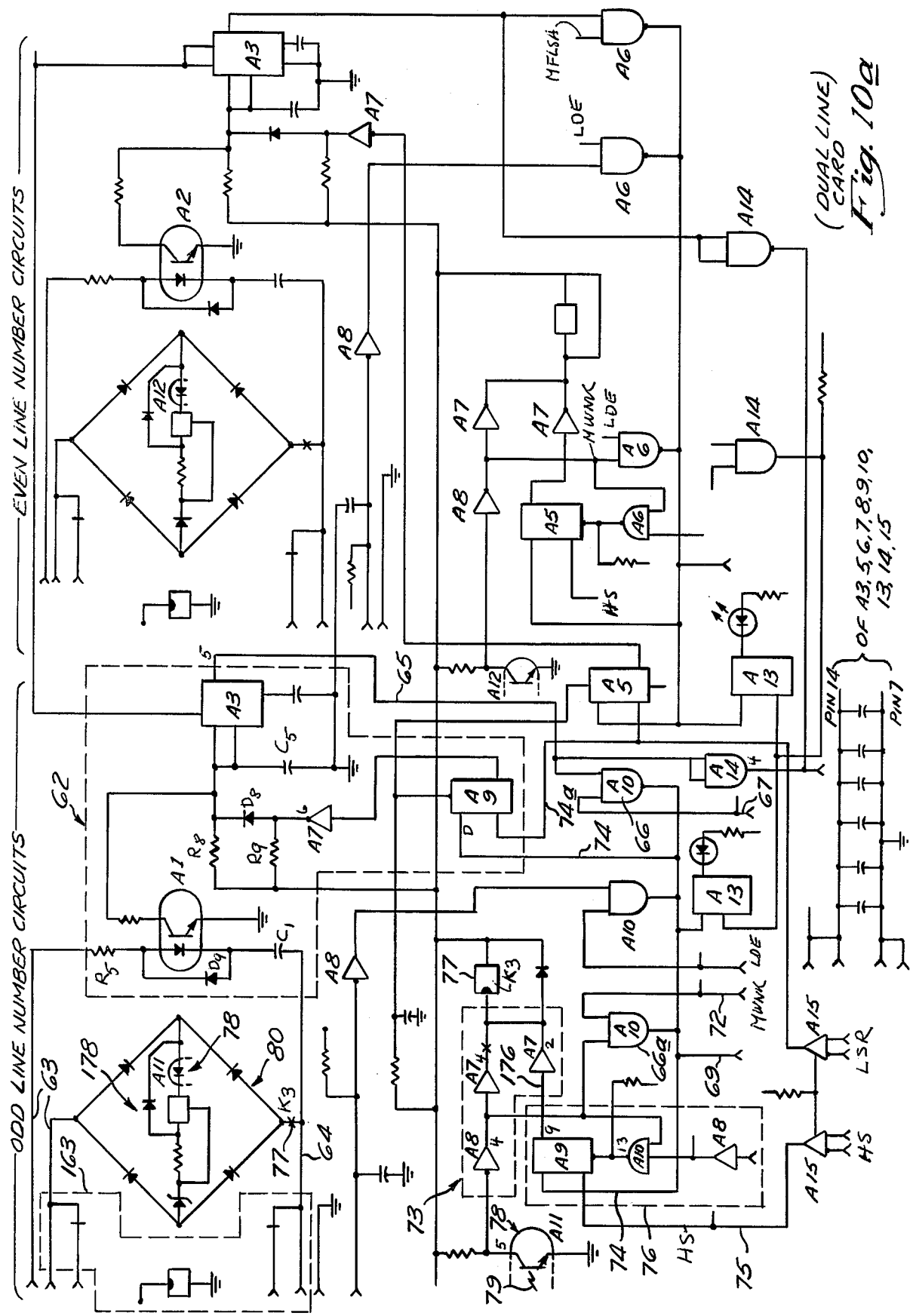

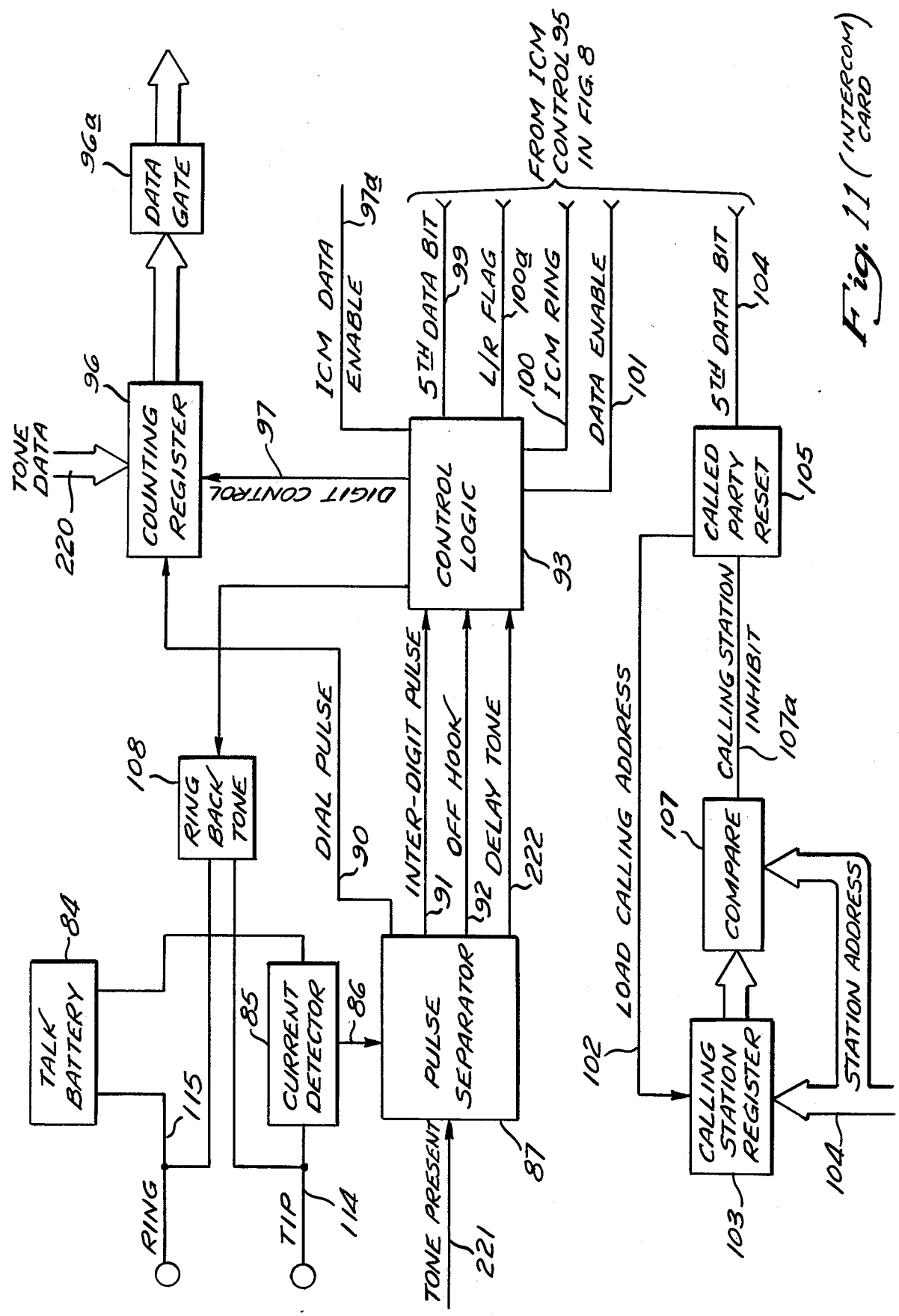

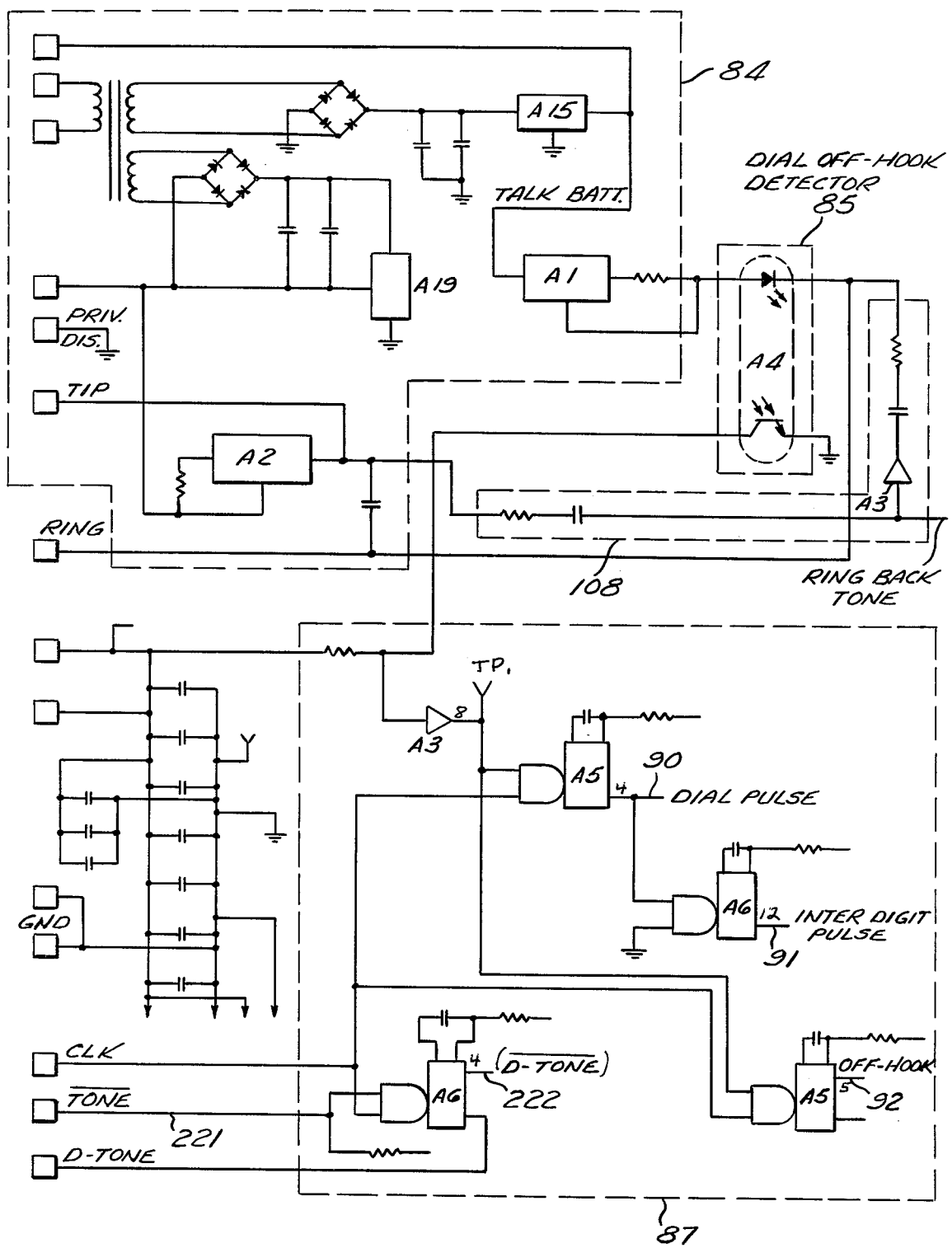
Fig. 11a (DIAL INTERCOM CARD)

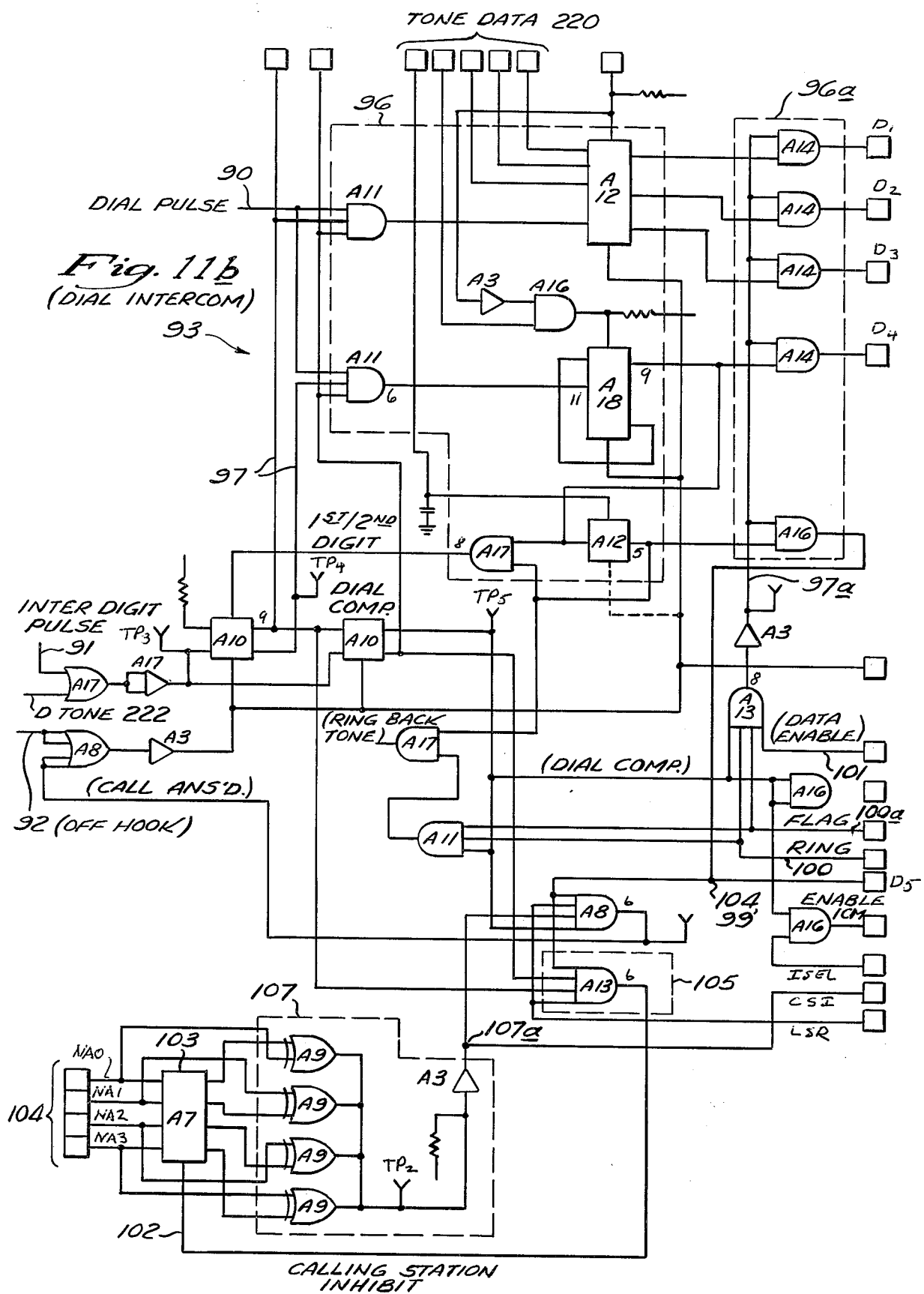

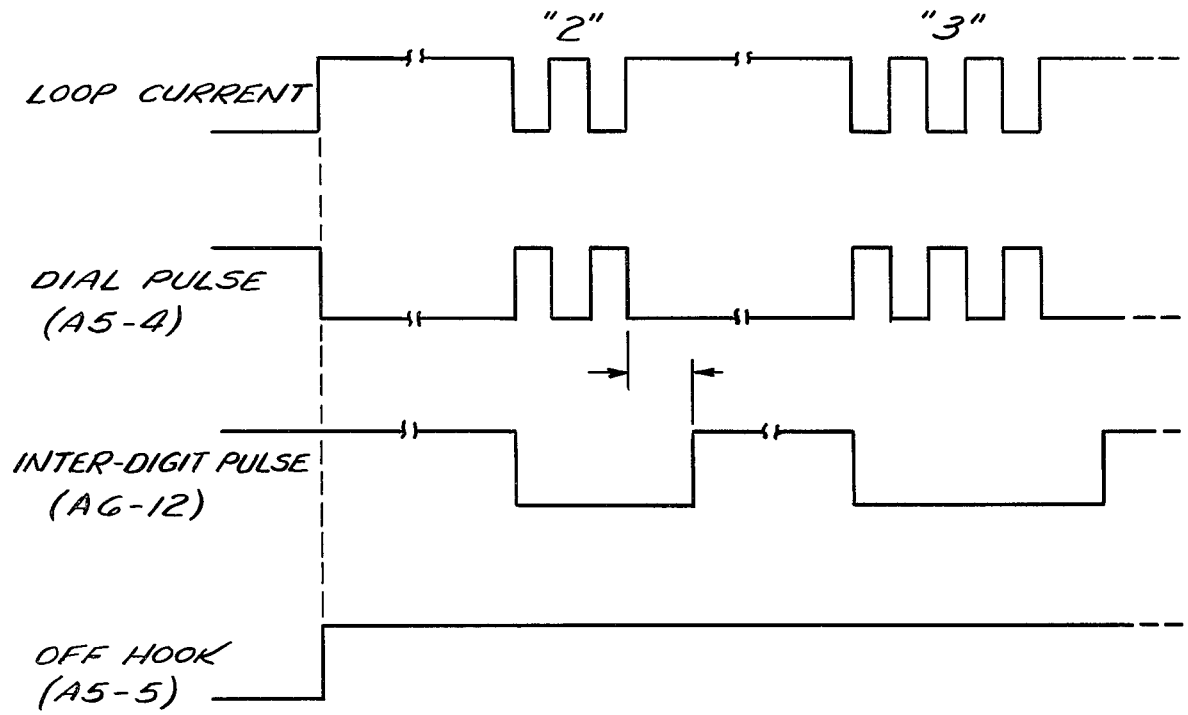
Fig. 11c (DIAL SIGNALS)
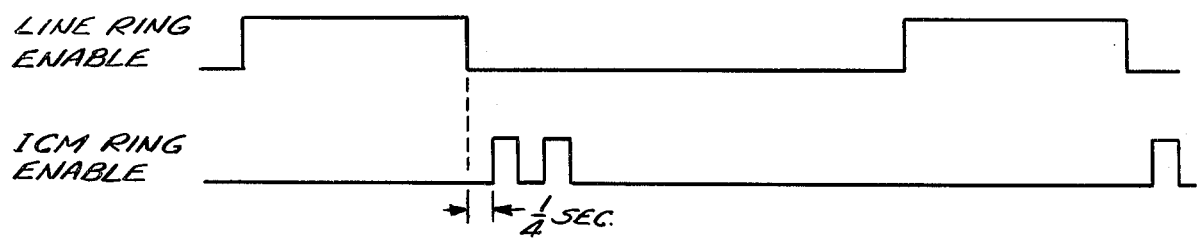
Fig. 12 (RING SIGNAL TIMING)

INTERCOM CODES

| DIALED NO. | ICM RING CODE | | | | | NOTES |
|---|---|---|---|---|---|---|
| | B4 | B3 | B2 | B1 | B0 | |
| 11 | 0 | 1 | 0 | 0 | 1 | PAGE |
| 12 | 0 | 1 | 0 | 1 | 0 | |
| 13 | 0 | 1 | 0 | 1 | 1 | |
| 14 | 0 | 1 | 1 | 0 | 0 | |
| 15 | 0 | 1 | 1 | 0 | 1 | |
| 16 | 0 | 1 | 1 | 1 | 0 | |
| 17 | 0 | 1 | 1 | 1 | 1 | |
| 18 | 0 | 1 | 0 | 0 | 0 | |
| 21 | 1 | 0 | 0 | 0 | 1 | TWO-DIGIT INTERCOM |
| 22 | 1 | 0 | 0 | 1 | 0 | |
| 23 | 1 | 0 | 0 | 1 | 1 | |
| 24 | 1 | 0 | 1 | 0 | 0 | |
| 25 | 1 | 0 | 1 | 0 | 1 | |
| 26 | 1 | 0 | 1 | 1 | 0 | |
| 27 | 1 | 0 | 1 | 1 | 1 | |
| 28 | 1 | 0 | 0 | 0 | 0 | |
| 3 | 1 | 1 | 0 | 0 | 0 | ONE-DIGIT INTERCOM |
| 4 | 1 | 1 | 0 | 0 | 1 | |
| 5 | 1 | 1 | 0 | 1 | 0 | |
| 6 | 1 | 1 | 0 | 1 | 1 | |
| 7 | 1 | 1 | 1 | 0 | 0 | |
| 8 | 1 | 1 | 1 | 0 | 1 | |
| 9 | 1 | 1 | 1 | 1 | 0 | |
| 0 | 1 | 1 | 1 | 1 | 1 | |

Fig. 11d

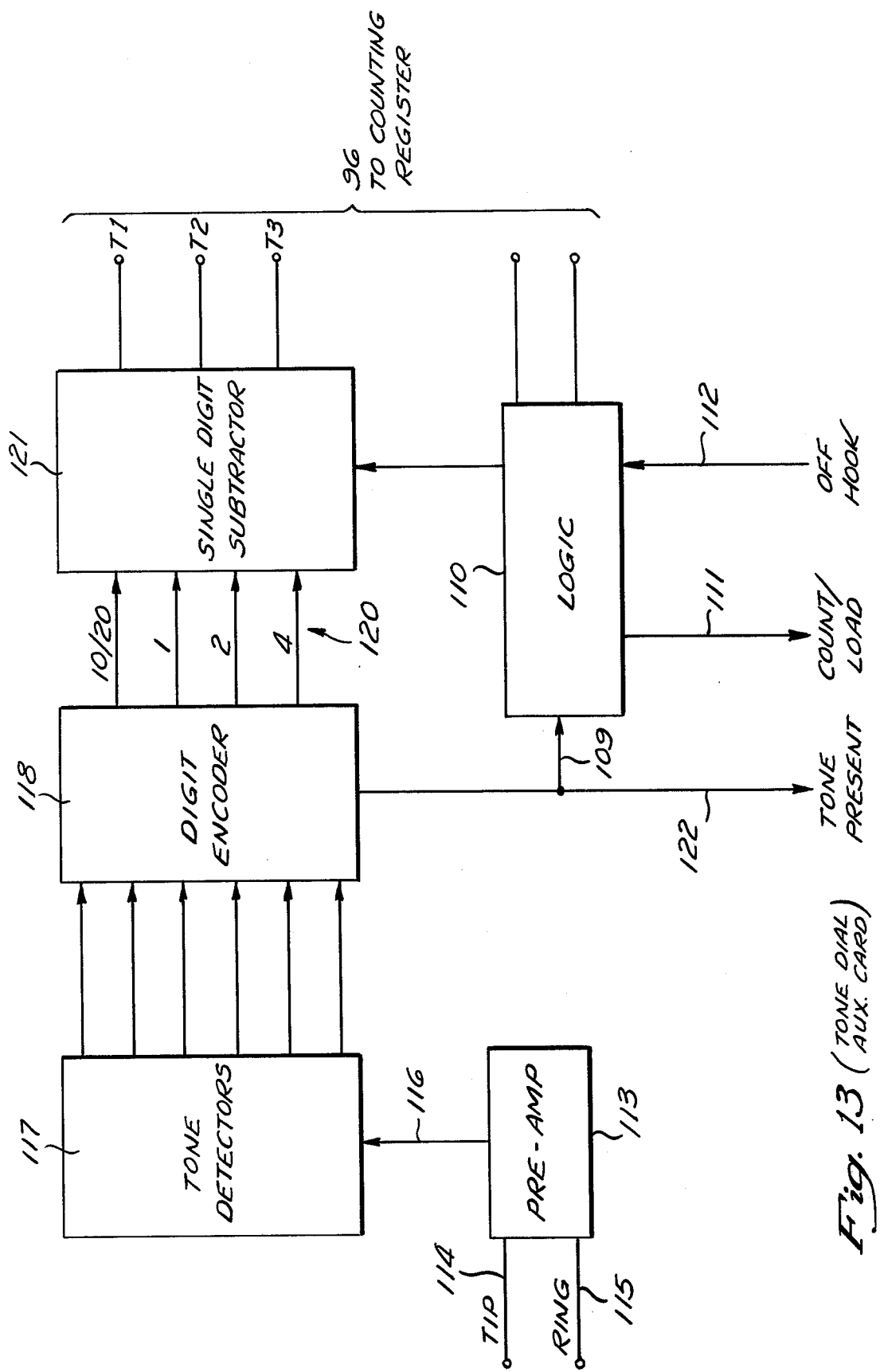

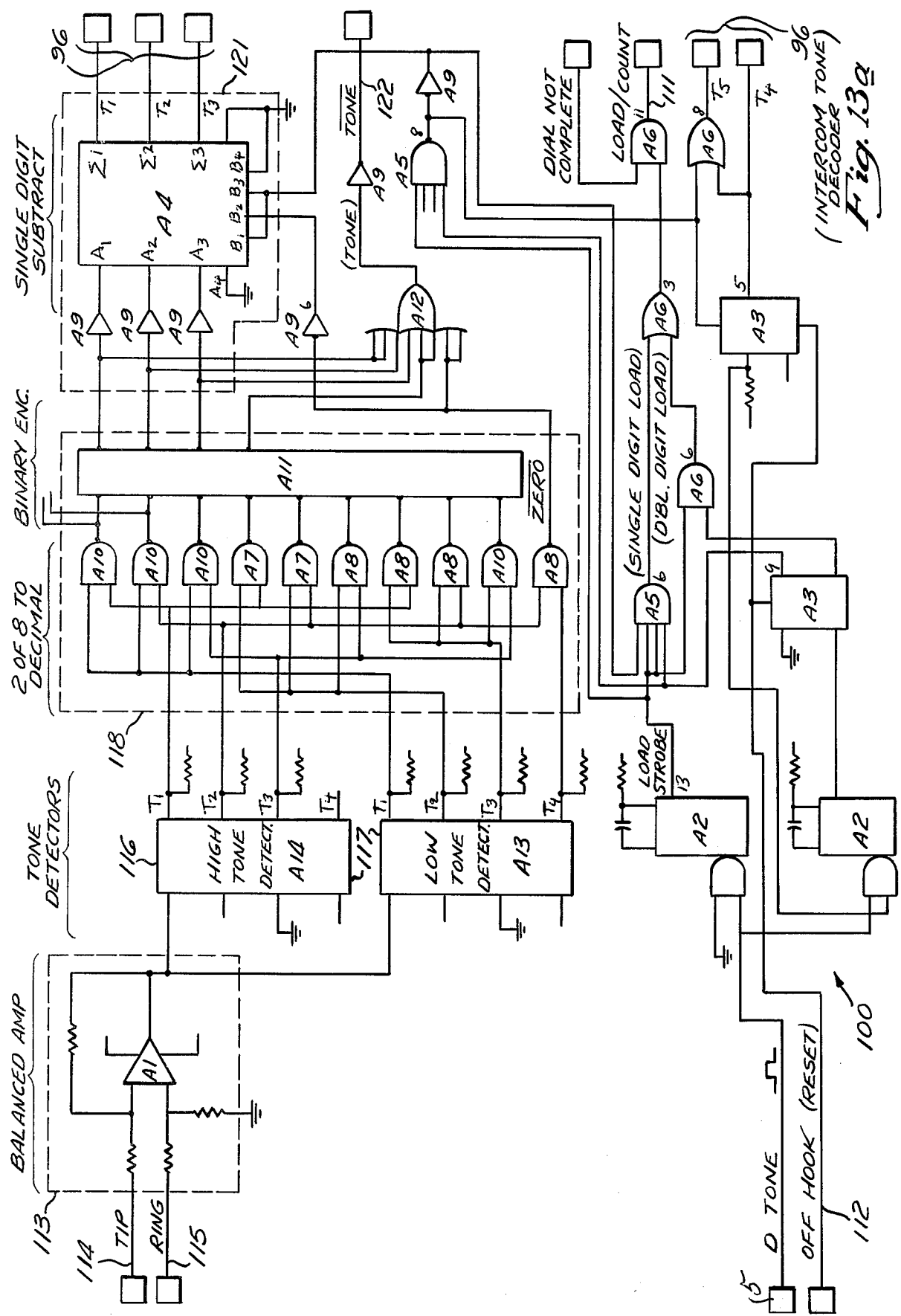

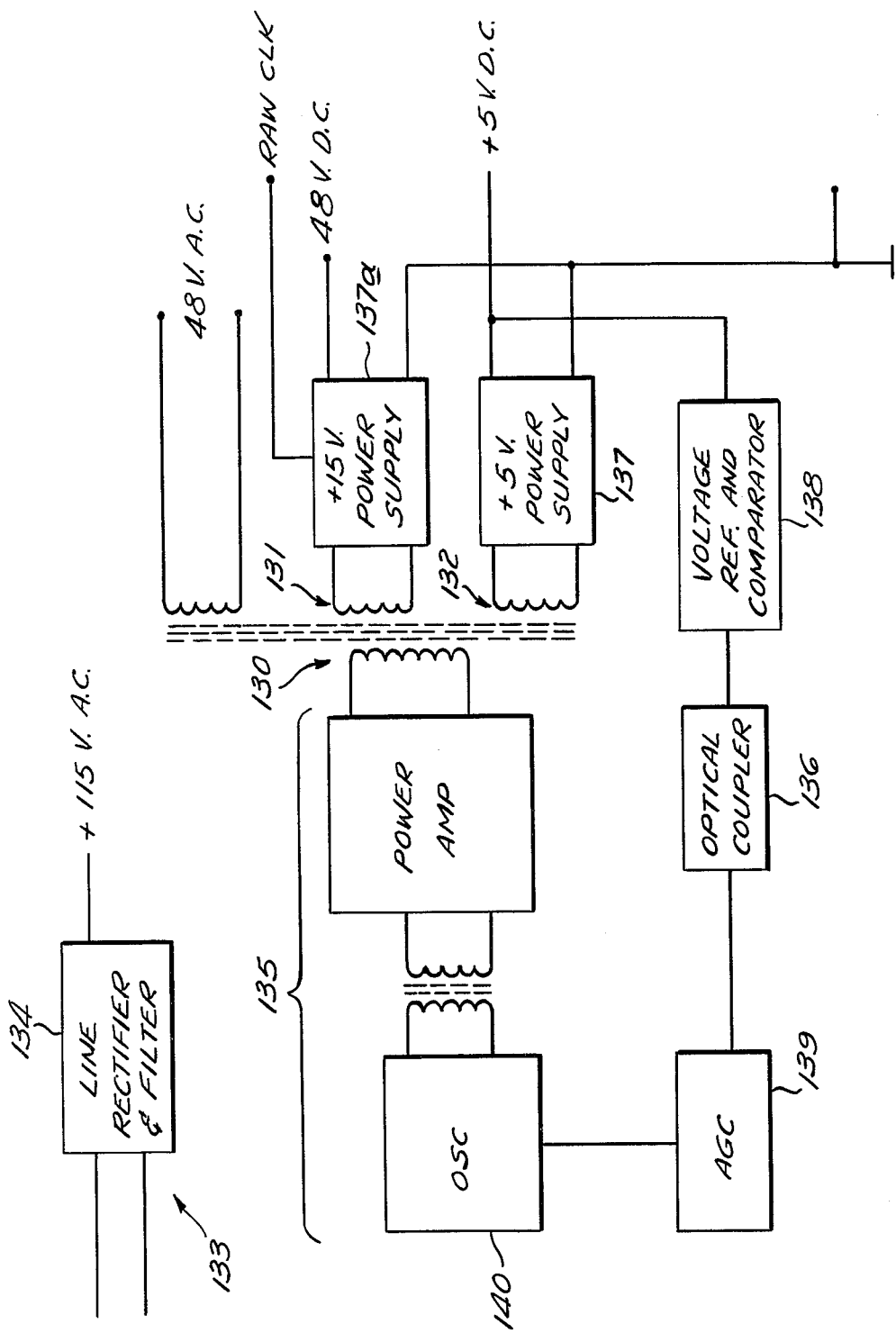
Fig. 14 (POWER SUPPLY)

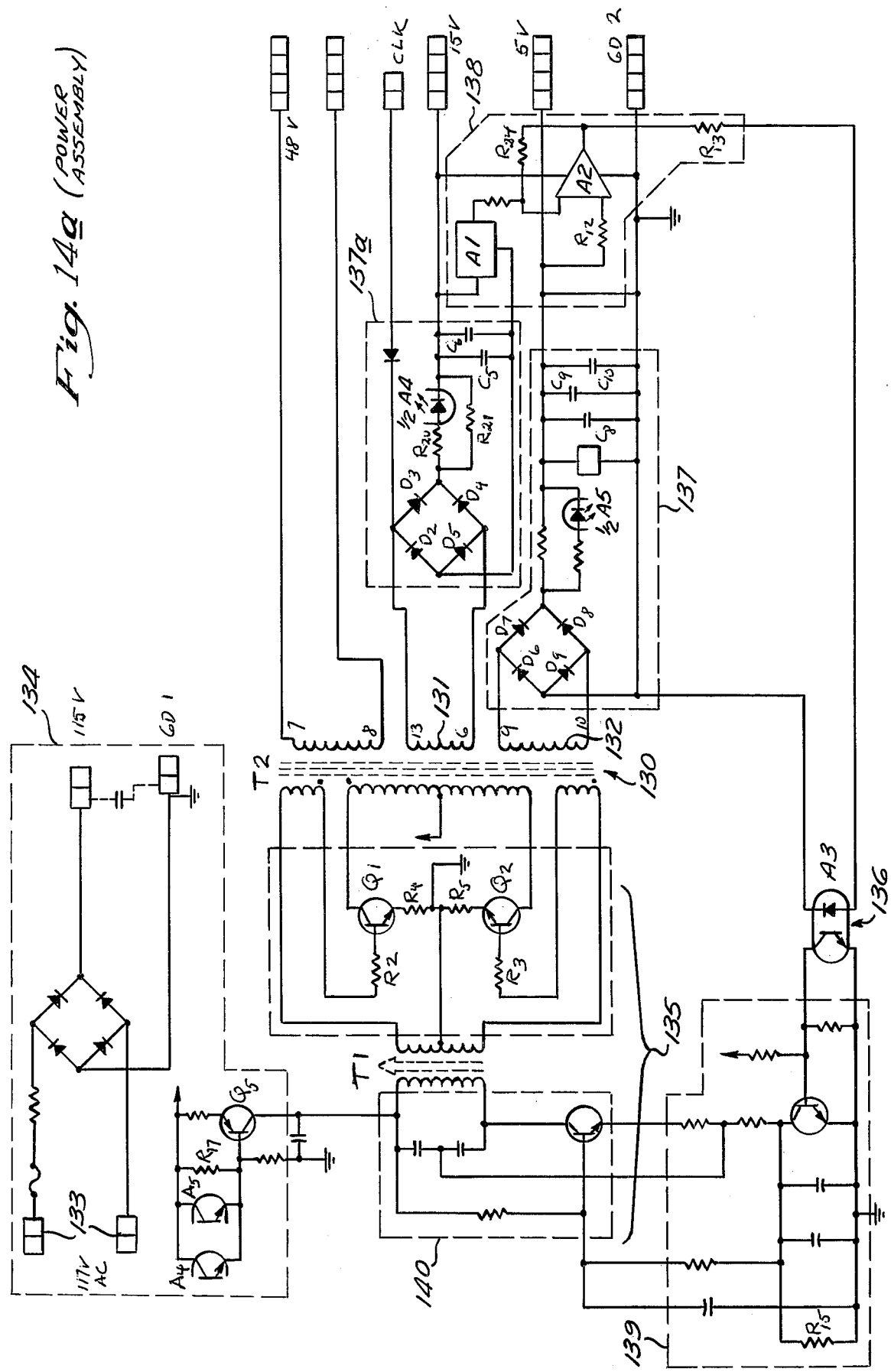
Fig. 14a (POWER ASSEMBLY)

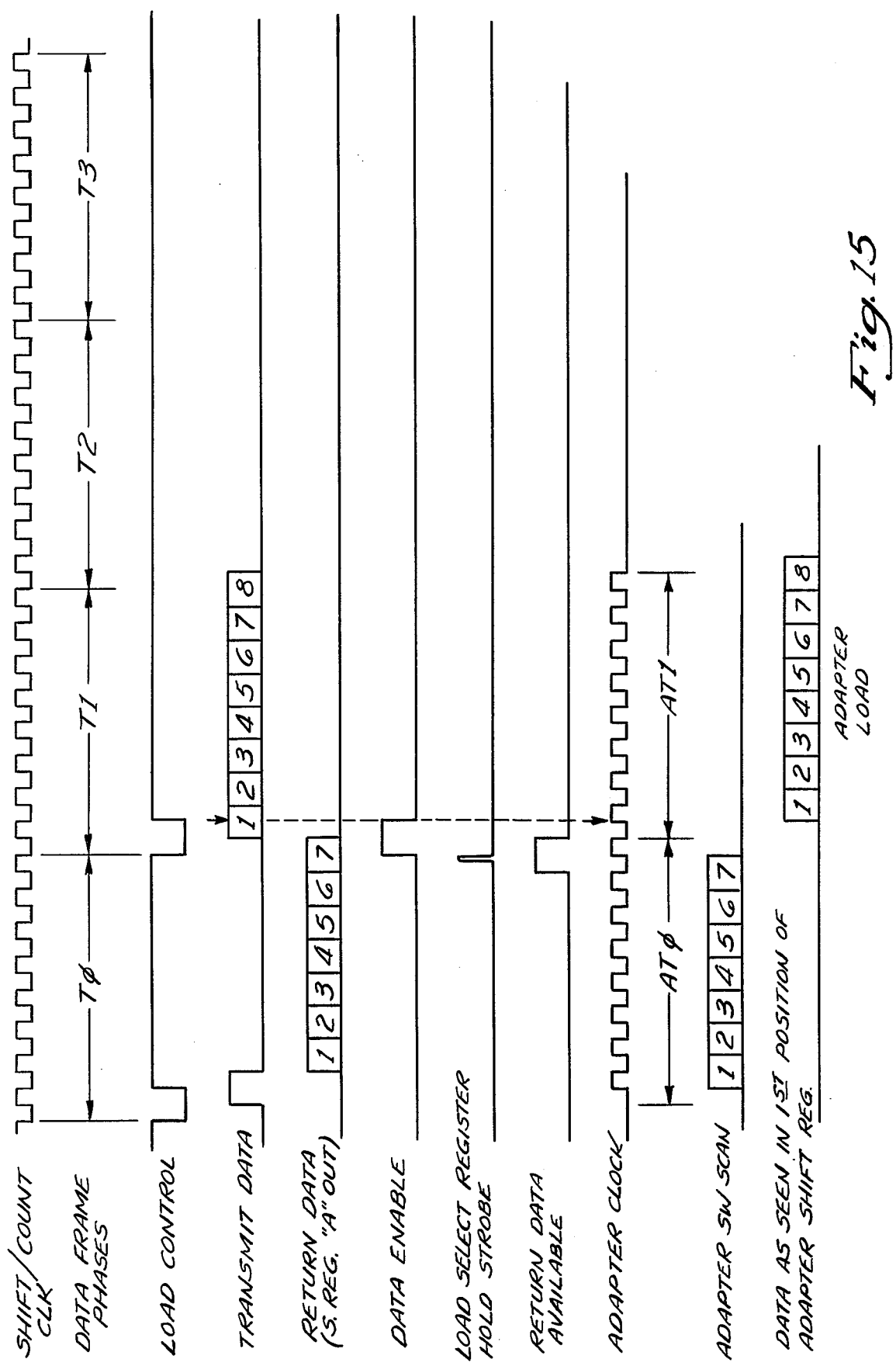

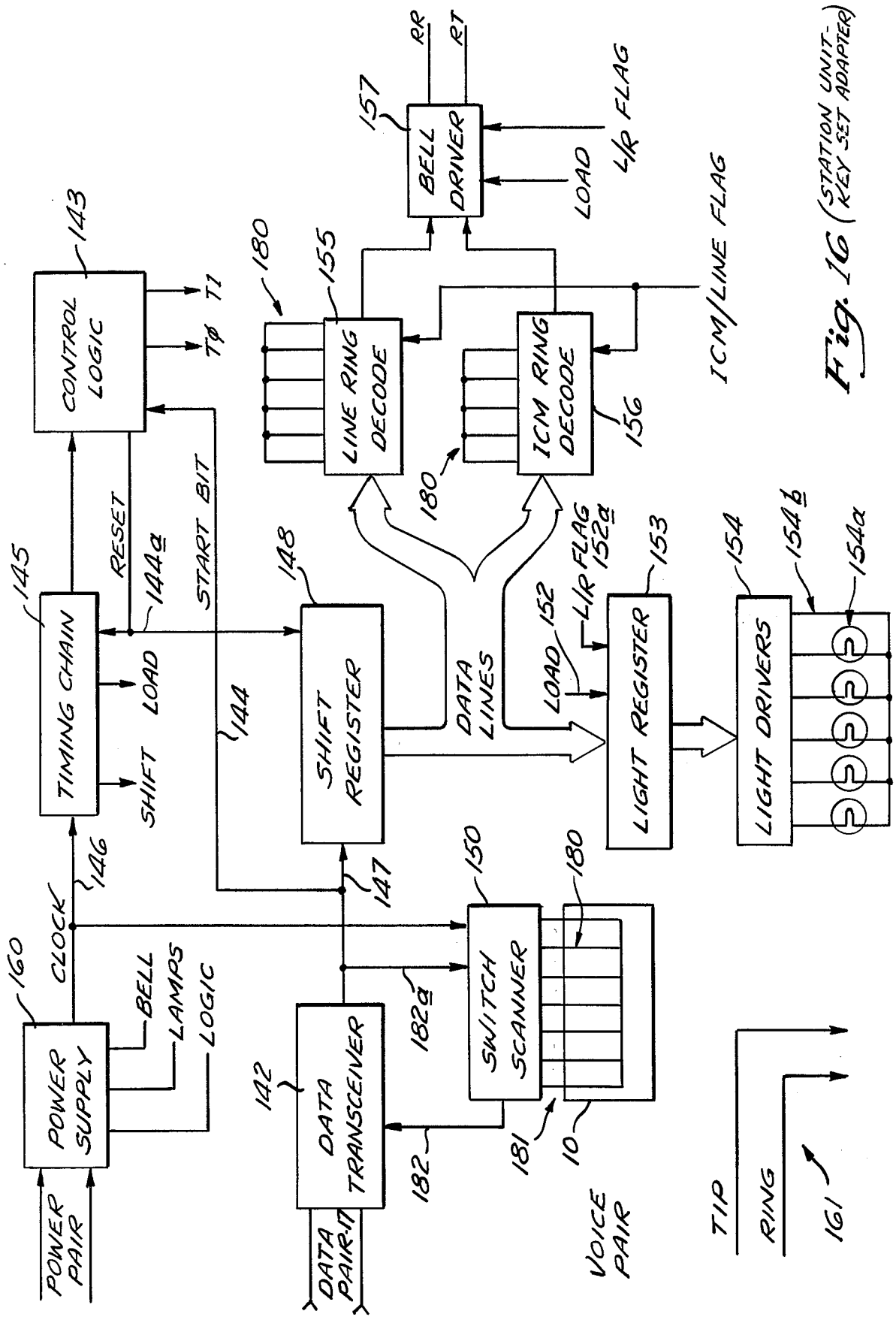
Fig. 16 (STATION UNIT-KEY SET ADAPTER)

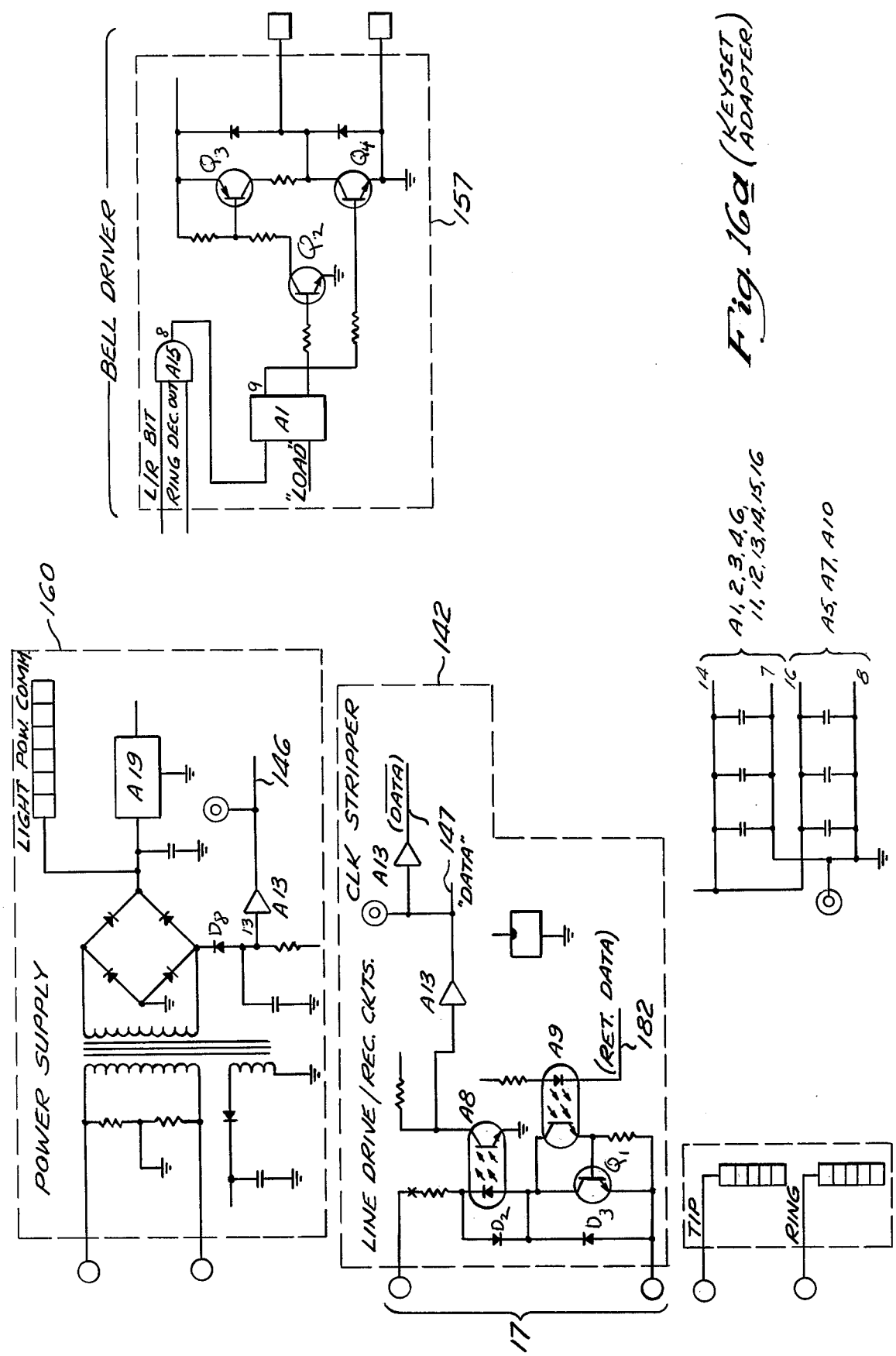
Fig. 16a (KEYSET ADAPTER)

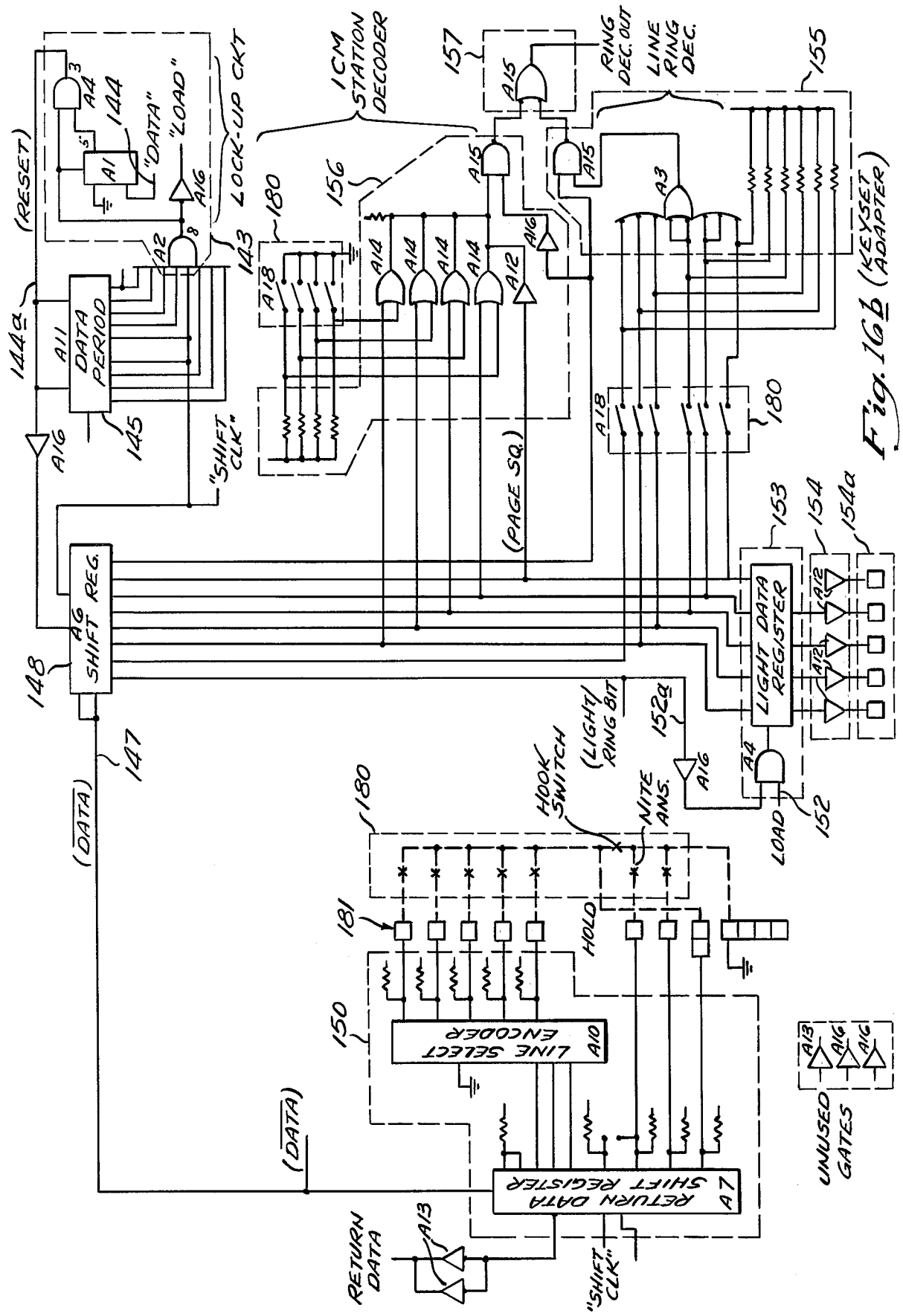
Fig. 16b (KEYSET ADAPTER)

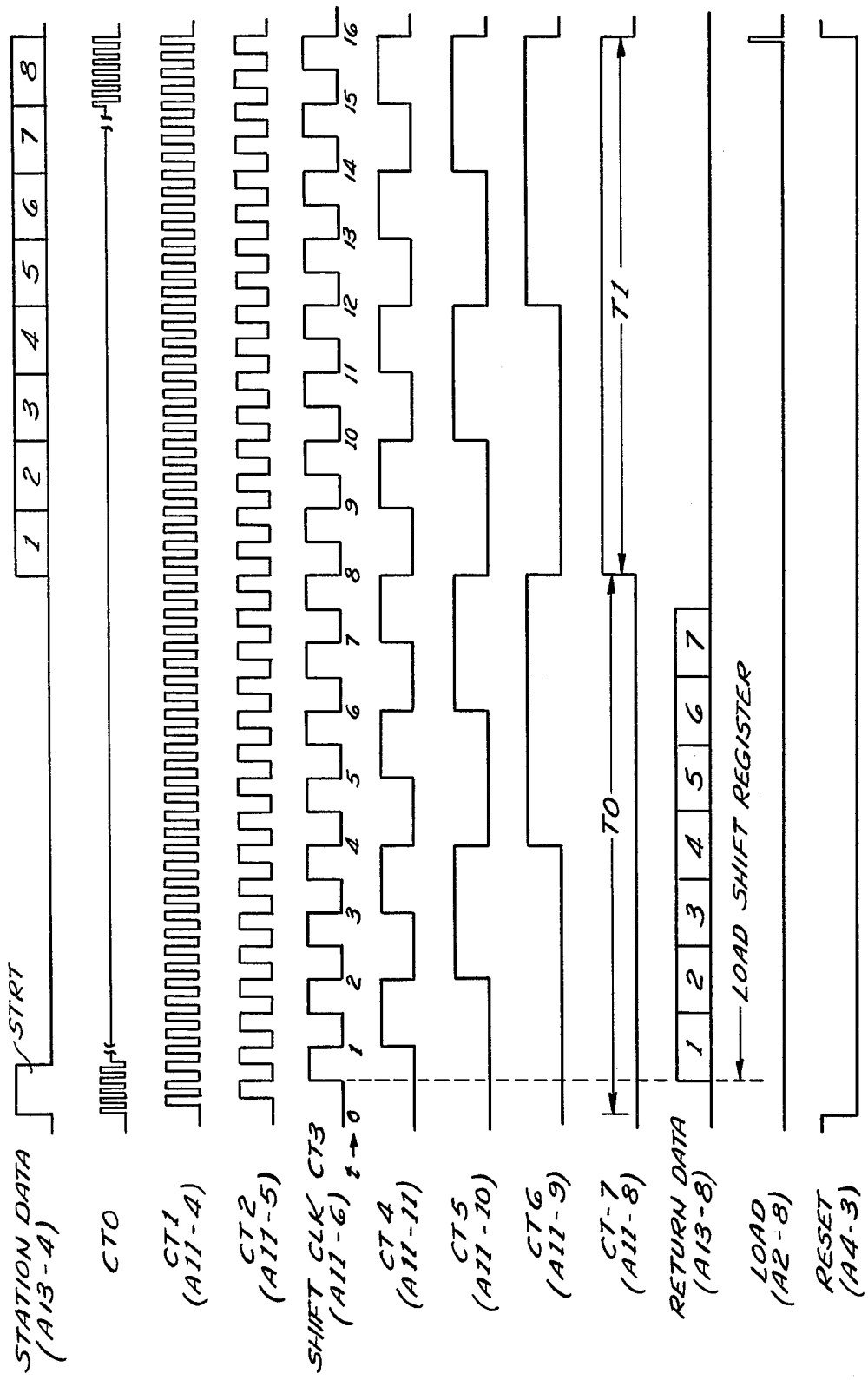
Fig. 16c (KEYSET ADAPTER TIMING DIAGRAM)

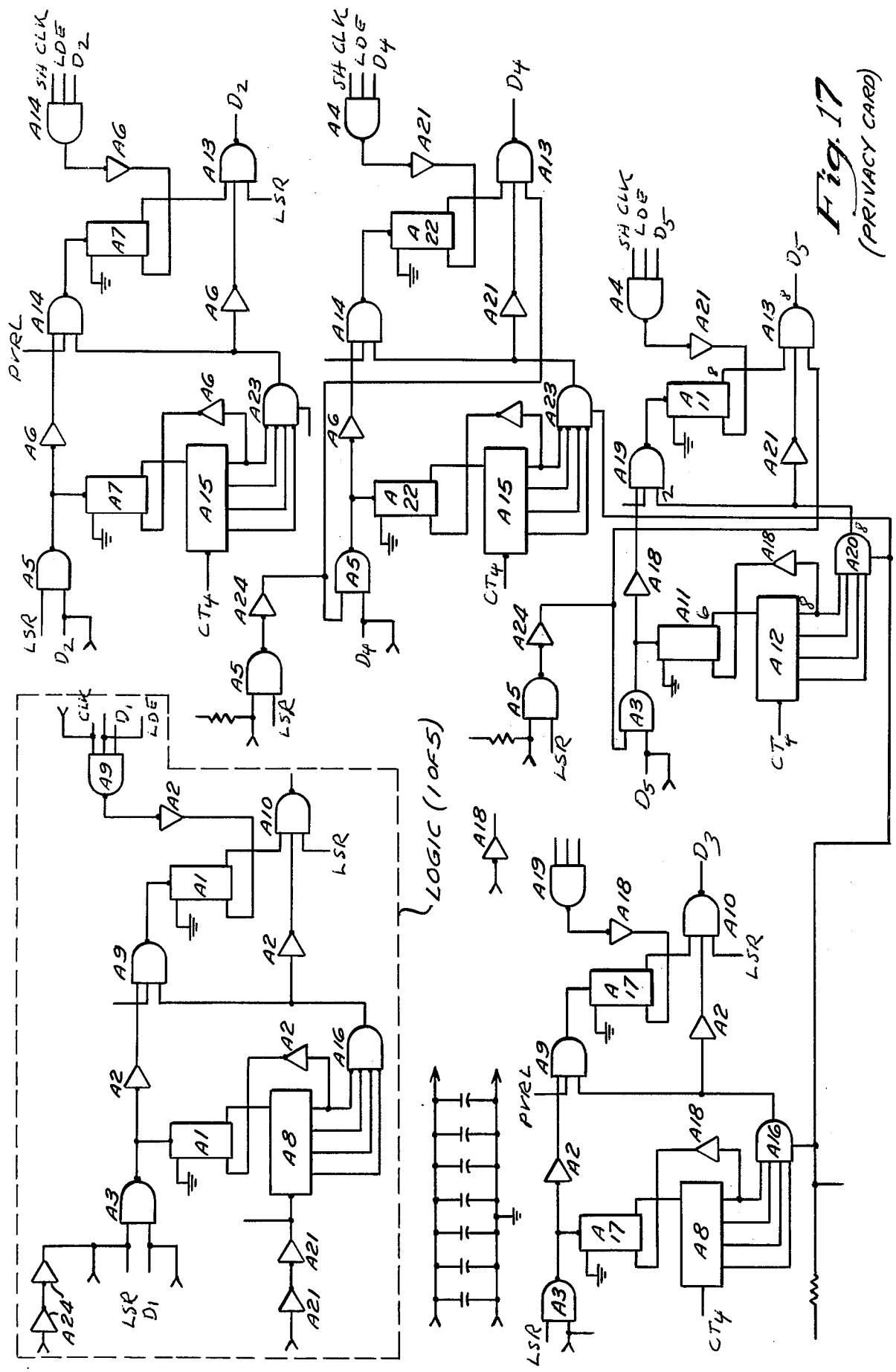
Fig. 17 (PRIVACY CARD)

KEY TELEPHONE SYSTEM AND METHOD

BACKGROUND OF THE INVENTION

This invention relates generally to key telephone systems, and more specifically concerns an improved system which realizes substantial reductions in installation costs, permits use of relatively small central units, provides compatibility with telephone apparatus speaker phones, automatic dialers, etc., and provides additional advantages, as will be seen.

The use of key telephones is a well established solution to many business telephone needs. These needs range from use as a primary telephone system for small and medium size business to supplemental service associated with PBX's, for the larger business. Such systems are ideal for business requiring up to five central office lines; or four lines plus an intercom.

SUMMARY OF THE INVENTION

It is a major object of the invention to provide a key telephone system incorporating combinations of the following advantages:

1. Business pre-wiring is made practical.
2. The system is compatible with several standard type station sets.
3. It is fully compatible with telephone apparatus such as speaker phones, automatic dialers, etc.
4. Intercom features, not found on small key systems, are incorporated.
5. Complete common or split bell arrangements are provided without requirements for additional apparatus.
6. System functions are partitioned for fast trouble isolation.

The system design concept is based on the principle that only one wire pair on a key system is used for talking. It is then possible to move the switching function to a central point where all station sets gain access to the telephone lines and to run only one talk pair to the individual station sets. This central point in the system is the central cabinet. Once this is done, it remains only to accomplish the other functions (selection, indication and audible) on as few other wire pairs as possible. Two additional pairs are used; one for control data and the other for power.

Accordingly, the system design reduces the number of wire pairs to each station set to three without sacrificing any of the system functions. This feature alone offers an immediate advantage of lower installation costs resulting from time materials and labor cost reductions. The design also permits the use of a small central unit with all terminations self contained.

Basically, the invention is concerned with a telephone system comprising a plurality of station sets each having a push button actuable line select switches, and comprises:

(a) multiple adapter units each connected with and proximate to a station set,
(b) multiple supervisory circuits to each of which at least two of said adapter units are connected via a talk pair, a control pair and a power pair, said circuits being remote from said adapters,
(c) system control means connected with said supervisory units via a data control bus for an asynchronously transmitting to each adapter unit via said supervisory circuits data including a start pulse causing the adapter to poll the line select and other switches in the station sets, and a data word corresponding to light, bell ringing or intercom bell ringing information.

In addition, dual line and intercom circuitry is provided to interface between the system control means and the central office, for purpose as will appear.

These and other objects and advantages of the invention, as well as the details of an illustrative embodiment, will be more fully understood from the following description and drawings, in which:

DRAWING DESCRIPTION

FIG. 1a is a block diagram of a conventional key system;

FIG. 1b is an overall block diagram of a system installation in accordance with the present invention;

FIG. 2 is an expanded block diagram of the present system installation, with reference to a single station unit or set adapter, and emphasizing the use of three wire-pairs;

FIG. 4 is a circuit diagram illustrative of system data pathing;

FIG. 5 is a data format illustration;

FIG. 6 is a graph showing switch settings in the set adapter for operation of the bell for line and intercom ringing;

FIG. 7 is a representation of a data transmission sequence for light and bell information;

FIG. 7a is a block diagram showing the involvement of basic elements in system data flow;

FIG. 8 is a block diagram of a system or common control card;

FIGS. 8a and 8b are detailed circuit diagrams illustrative of the FIG. 8 card;

FIG. 8c illustrates data formats;

FIGS. 8d–8j are timing diagrams;

FIG. 9 is a block diagram of a dual set supervisor (dual station) card, as incorporated in FIG. 2;

FIG. 9a is a detailed circuit diagram illustrative of the FIG. 10 card;

FIG. 10 is a block diagram of a line circuit, two such line circuits being on in each dual line card, as represented in FIG. 2;

FIG. 10a is a detailed circuit diagram illustrative of the FIG. 10 card, including two FIG. 10 circuits;

FIG. 11 is a block diagram of a dial intercom card;

FIGS. 11a and 11b are detailed circuit diagrams illustrative of the FIG. 11 card;

FIG. 11c is a dial signal timing diagram;

FIG. 11d is an intercom card tabulation;

FIG. 12 is a timing diagram showing ring signal timing;

FIG. 13 is a block diagram of a tone decoder card usable along with the intercom option of FIG. 11;

FIG. 13a is a detailed circuit diagram illustrative of the FIG. 13 card;

FIG. 14 is a block diagram of a power supply card, as also seen in FIG. 2;

FIG. 14a is a detailed circuit diagram illustrative of the FIG. 14 card;

FIG. 15 is a timing diagram showing one complete frame of data transmission and return (see also FIG. 7b);

FIG. 16 is a block diagram of a key set adapter card, i.e. station unit card;

FIGS. 16a and 16b are detailed circuit diagrams illustrative of the FIG. 16 card;

FIG. 16c is a Keyset Adapter Timing Diagram; and

FIG. 17 is a detailed circuit diagram of an optional privacy circuit card.

DETAILED DESCRIPTION

Figure 3:
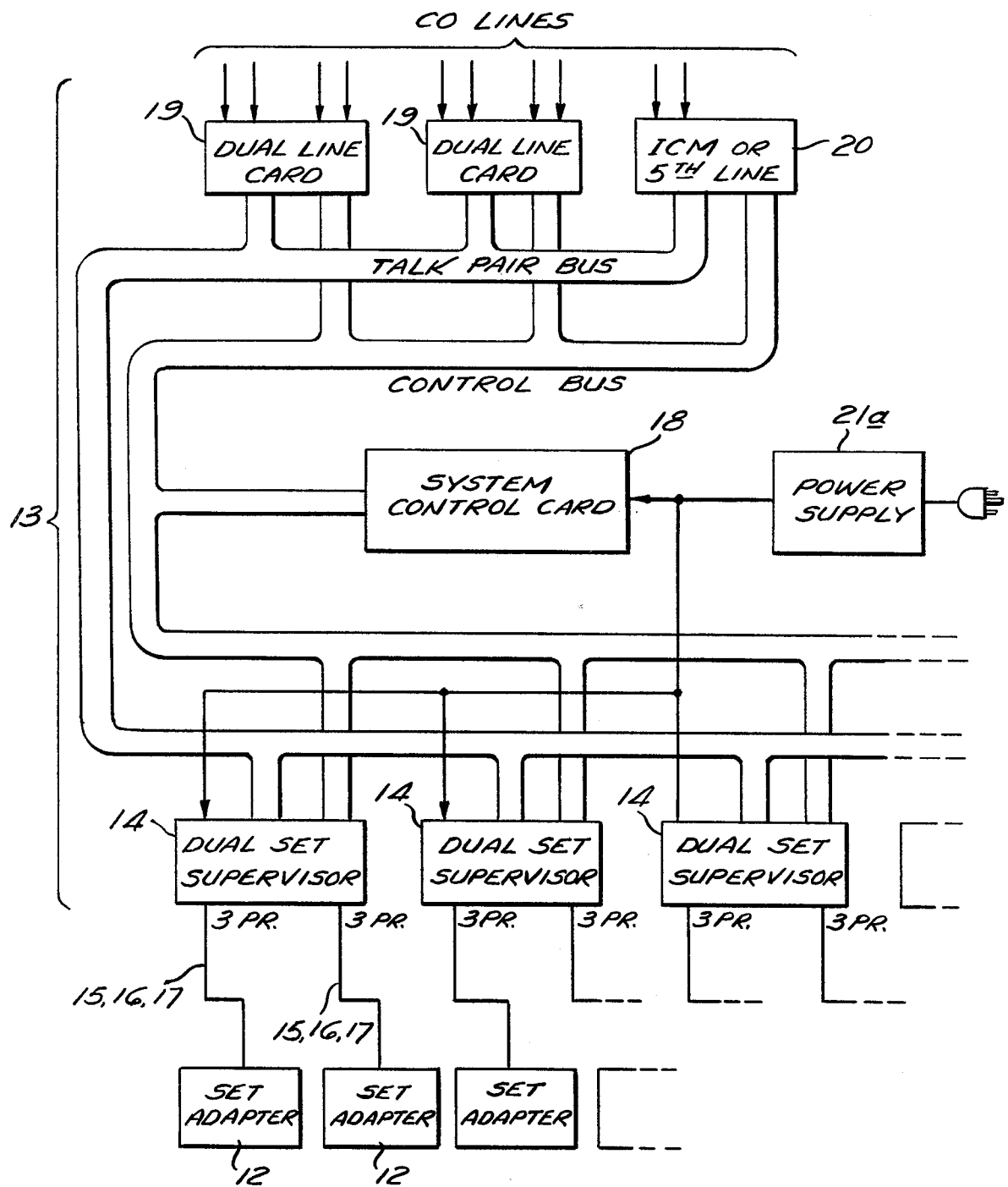
FIG. 3 is an overall system block diagram, and showing various cards used in the central cabinet, and with reference also to multiple set adapter or station units.

In FIGS. 1b, 2 and 3, the improved telephone system 10 comprises a plurality of station sets, as for example at 10, each including a plurality of key buttons 11. A set adapter or station unit 12 is provided for each set, each adapter adapted to process data to and from its associated station set, and to drive the lights and ringer at the set. An electronic control unit (ECU) or control cabinet 13 is typically located in the same building as the adapters, or in the vicinity of the latter, there being three pairs of wires running from the ECU to each adapter. More specifically, and as shown in FIG. 3, the ECU typically incorporates a plurality of station cards, as for example dual set supervisory circuits 14, one card for each of at least two adapters, as shown. Two parallel groups of wires run from each card 14 to the two respective adapters associated with the card 14, and each group includes three wire pairs, i.e. a talk pair 15 a power transmission pair 16 and a control pair 17 used for transmission of data related to signaling and switch status.

The voice pair 15 consists of the standard tip/ring telephone circuit with metallic switching in the central cabinet. The central cabinet 13 is therefore a transparent link between the central office 180 and the standard 500 type network of the station sets. The control pair 17 is a half-duplex data path which is used alternately to transmit switch status to the central cabinet and the light/audible status to the station set. The data speed is central cabinet adjusted to accommodate the wink/flash rates of the lights and the switch response time required. The power pair distributes approximately 43V AC power to the station sets. The AC voltage also synchronizes the data flow in the system.

Accordingly, the system basically consists of a single wall mounted central cabinet plus a wall mounted or desk-top key set adapter for each station set. The central cabinet contains control electronics, intercom, line switches, wire terminations, and a power supply. Quick-connect terminal blocks are completely enclosed within the central cabinet and do not require any cross-connects or jumper wiring.

It contains the circuit for system control, line management (hold and ring detection) and optional functions such as intercom. All line switching takes place in the central cabinet and is handled by protected dry switched reed relays. As seen in FIG. 3, the cabinet houses the system control card 18, dual line cards 19, dual set supervisor cards 14 and the power supply 21a. A dial intercom card 21 is used in place of one of the dual line cards on a system incorporating the intercom option.

As will be seen, each supervisor circuit or card 14 is operable to select a talk pair for a particular station set 10, to send data to and receive data from the adapter 12 associated with that set, and to provide light data for a particular line associated with that set. The card 14 interfaces two station sets to the central cabinet. This card switches the voice pair to the selected central office line (trunk), and it also contains circuitry for the data send/receive functions. A system using one or two station sets requires one dual set supervisor 14. For each dual set supervisor added (up to eight), two station sets can be added.

The system control card 18 of FIGS. 3 and 8 contains the central timing circuitry, performs the data processing functions, and controls all of the decision making functions of the system. All of the control and status signals for the individual station sets and line circuits (trunks) are processed by this card.

The dual line card 19 of FIGS. 3 and 10 contains the circuitry for those functions associated with the management of two central office lines (trunks). These functions include ring detection, line hold, and light data. This card interfaces the two lines to the Central Cabinet. The number of Dual Line Cards required for a particular application is listed in Table 1:

Table 1

| Dual Line Card Requirements | |
|---|---|
| Central Office Lines (Trunks) Used | Number of Dual Line Cards Required |
| 1 | 1 |
| 2 | 1 |
| 3 | 2 |
| 4 | 2 |
| 5 | 3 |

The dial intercom card 21 of FIG. 11 is typically inserted in the central cabinet in place of one of the dual line cards. It contains the talk battery and the dialing register, and decodes the dialing signal, selects the station, and sends a two short-ring ringing signal to the called station. The ring signals continue until the call is answered or abandoned. The dial intercom card is compatible with rotary dialing station sets. An option card (see FIG. 13) provides compatibility with tone dial station sets. Systems using the intercom option are limited to four central office lines (trunks).

The intercom tone card of FIG. 13 is an optional unit used on the dial intercom card when the system uses tone or a mixture of tone and rotary dial station sets. It contains the tone detectors and logic required to convert the tone signals to binary bits, which are compatible with the dial intercom card counting register.

The set adapter 12 of FIGS. 3 and 16 processes data to and from the central cabinet and drives the light and audible signals at the station set. One set adapter is required for each station set. This unit also contains the circuitry for monitoring the line select switches. Any of three set adapter configurations may be used. One is wall mounted and measures approximately 5 × 7 inches by 1 inch deep for example. This unit accommodates the 50 pin set tail plug of the standard key set, such as the 564/2564 types. It also provides terminations for the three wire pairs from the central cabinet. It contains the set electronics which makes the standard keysets compatible with the present system. A set of small switches is contained inside the wall unit for setting the line ringing arrangement and the intercom number when the intercom option is used.

The under the phone version of the set adapter first directly underneath single line set Models. The front section of the adapter contains the lamps and switches, and the electronics are contained in the thin section beneath the station set. Terminations for connection to the station set and back to the central cabinet are located at the rear of the set adapter. The three wire pairs are connected back to the central cabinet through a standard mounting cord and station block.

A third version of the set adapter is a desk top unit which permits the use of any decorator or standard type station set. All of the key set functions are contained in this unit. Again, only three wire pairs are returned to the central cabinet.

Referring now to FIG. 4, the data path originates at the system control card 18 which contains a power driver 23 for sending data via bus 24 to all station sets in the system. These data signals are processed through the dual set supervisor 14 which drives the data pair 17 for each key set adapter 12. A matching impedance 25 for each data pair is located on the respective dual set supervisor 14. Associated with each of these matching networks is a "receive" circuit 25a which responds to data returning from the key set adapter 12. This data is gated onto a common return data bus 24a when requested, by a control signal from the system control card. The driver 23 on the system control card is balanced to reduce any electro-magnetic interference generated by the system. It thus prevents interference with other systems and provides common mode noise rejection from other sources. Data is returned in a balanced condition for these same reasons. This balance is maintained, through the dual set supervisor 14 out to the individual key set adapter 12.

The data format is illustrated in FIG. 5. Data transmission is of the asynchronous type, somewhat similar to the standard used for data transmission to teletype sets. The data transmission sequence is begun by a "start pulse" 26 which is transmitted from the system control card 18 to each key set adapter. The key set adapter responds, by polling each of the line select switches in the respective station sets. This is followed by the transmission of an 8-bit data word, at 28, from the central cabinet to all station units. Five bits of data (see also FIG. 8c) are associated with the lights or bell. The information in these five positions is interpreted as light data when the last bit is in the "light" state. When the last bit is in the "bell" state, the five line bits refer to the bell signals. There are two types of bell information, one concerned with lines ringing, and the other with intercom ringing. This is indicated by the first bit. Data transmission may contain any one of three types of information: (1) light, (2) "line ringing" bell, or (3) "intercom ringing" bell. The state of the first and last bits identifies which of the three types of information is contained in the word being transmitted. If the last (8th) bit is in the true (on) state, the data contains light information. If this bit is in the false (off) state, the data controls either the "line ringing" or "intercom ringing" bell functions. When the first bit is in the true (on) state, the data controls the "intercom ringing" bell functions. Otherwise during a bell data transmission, any previous "light" information is stored so that the lights will not be affected by the "bell" data.

FIG. 6 shows the switch settings in the Set Adapter 12 for operation of the bell for line and intercom ringing. Note that the first five switches are concerned with lines ringing and the last four switches are concerned with the intercom dialing number. The control circuits of the adapter compare the two functions bits (first and last) with the switch setting in order to determine the disposition of the five line bits. The light data is stored during ring information transmission so that ring signals do not appear in the visual display.

The data transmission sequence for light and bell information is illustrated in FIG. 6. The data transmission rate is 96 frames (words) per second. Note that two frames of light information are followed by two frames of bell information. This sequence of light vs bell information corresponds to a light or bell data update of 24 times per second. This update rate produces the 24 Hz bell ringing frequency which is compatible with the standard ringers used in the station sets.

Figure 7B:
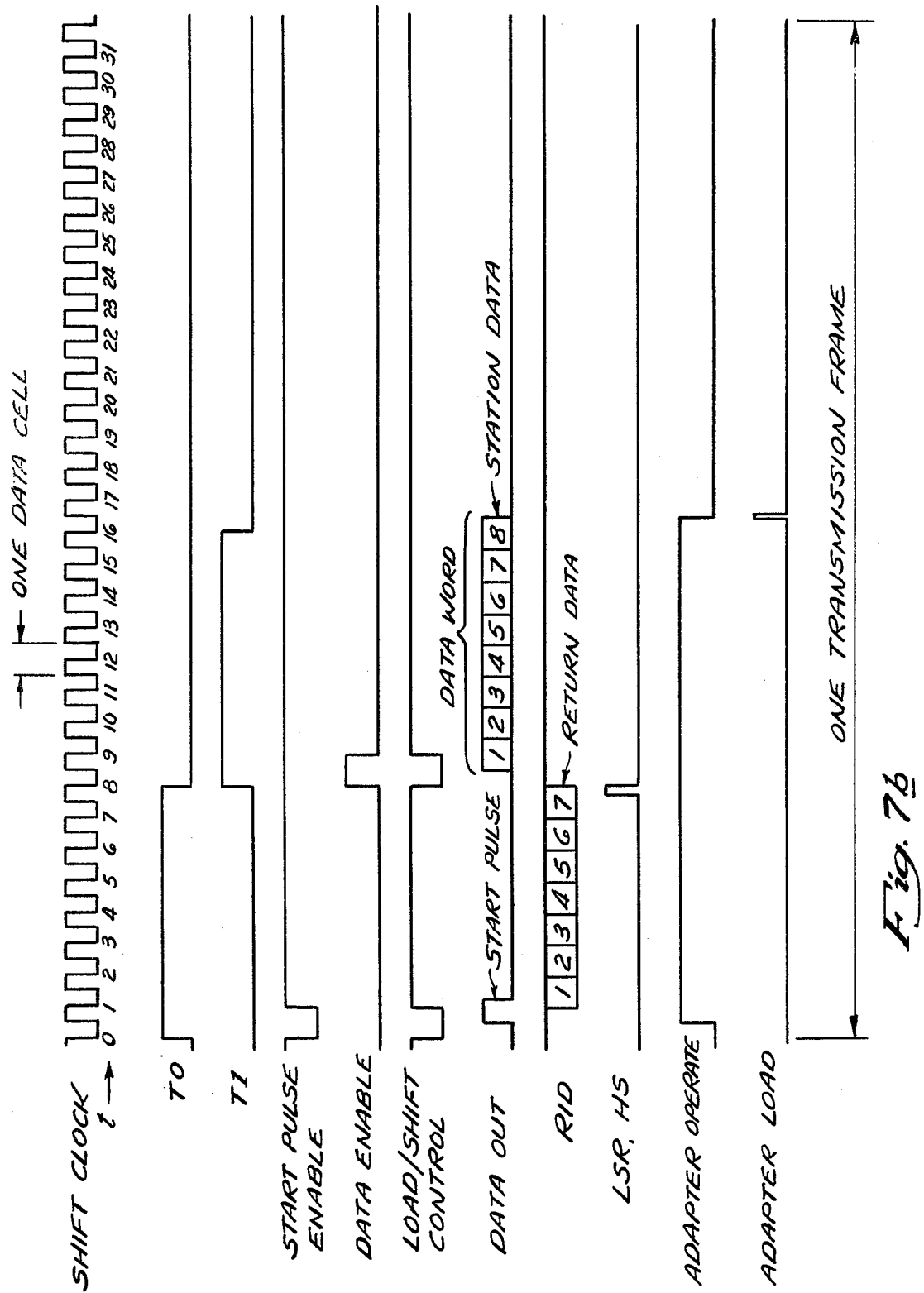
FIG. 7b is a timing diagram illustrating timing details involved in one complete cycle of data transmission and return.

FIG. 7a shows the essential elements involved in the system data flow. Only one Set Adapter 12 is indicated but up to sixteen could be involved in the polling scheme. The control circuits on the System Control Card 18 consist mostly of a binary count-down chain from the power supply frequency. The various control and timing signals for the system are derived from this counter. The control circuit 12a in each Set Adapter contains similar count-down chains driven by the same power frequency. The control circuit at the Set Adapter is synchronized to the Central Unit control circuit by a sync pulse (Start Bit). See FIG. 7b in this regard. The data flow consist essentially of the exchange of information between the shift registers of the Central Unit and the Set Adapters.

FIG. 7b gives the details of one complete cycle of data transmission and return. The total frame is divided into four phases (T0-T3). The first two phases are the active portion and the last two phases are quiescent for synchronization purposes. The process begins when the System Control Card produces the start bit. During the T0 phases the load control signal on the Common Card causes the loading of a single bit into the last position of its shift register. This bit is shifted out immediately by the shift clock. The transmit data is then quiescent for the remainder of the T0 period. When the start bit is received, it initiates the return data action at the Set Adapters.

In the block diagram of the system control card as illustrated in FIG. 8, all system timing functions are controlled by the clock signal at 30 which is derived from the system AC power 31. This clock signal is used for the operation of the timing chain 32 which provides all of the shifting, strobing and control timing periods. It governs the data rate to the key set adapter, the wink and flash rates of the lights on the station sets as well as the timing for ringing the station sets. The control logic 33 is responsive to signals from the time chain and to data returned at 24a and the key set adapter. It uses these signals to produce the control signals at 35 required for the operation of the system. The station address is used to determine which station set is providing the return data that is shifted at 36 into the data register 37. The station address and various strobe pulses are presented to the data bus 24 along with the data for communicating with the other electronic cards in the system.

Return data, from the addressed key set adapter, is presented to the system control card 18 by the data bus 24a. This return data is tested in the return data test circuit 38 to verify that it is a valid return. A faulty key set adapter at the addressed station set, or no key set adapater present at a particular address would present an invalid data condition. Such data would be blocked, thereby preventing false operation of the system. Valid data passes into the data register 31 during the proper portion of the control cycle (FIG. 5).

When the data word is completely assembled into the data register, it is presented to the data bus for transmission to the dual set supervisor 14, dual line cards 19 (in the case of hold or reset of ring detection), or to the dial intercom card 21 (when an intercom call is answered). At this point, and with reference to FIG. 9 the line select register (i.e. LSR) strobe signal at 40 effects loading of the data into the appropriate dual set supervisor LSR 41 or 141. At the proper time the control logic 33 also causes the "light" data received from the dual line cards and dual set supervisor to be strobbed into the data register 37 via the data bus 42. See the control line 43 from logic 33 to bus driver 44. It is then shifted out to the data driver circuit 23 which provides the signal at 24 required by the dual set supervisor 14 for driving the individual control wire pairs 17 to the key set adapters 12.

The control bus gate transfers parallel information from the data register onto the control bus at the proper time. This is the "select" information which goes to the line select registers on the dual set supervisor.

Referring to FIG. 9, the dual set supervisor serves three functions; (1) selects the voice pair 15 for a particular station set, (2) sends data to and receives data from the key set adapter via connections 17, and (3) is the source 59 and 159 of light data at 60 for a selected line. A block diagram of the dual set supervisor is illustrated in FIG. 9. Two of the three wire pairs that connect to a key set adapter originate at this card. The third wire pair 16 (power) originates from a common tie point for all key set adapters. When a particular station address appears at its associated dual set supervisor 14, the return data path is enabled via decode unit 46, enable connections 47 and 48 and buffers 49 and 50 so that data from the station set flows to the system control card via path 24a. The system control card of FIG. 8 then presents parallel data back to the control data bus 42. At the proper time in the data transmission sequence, the line select register strobe signal 40 is gated through the address decode circuitry 46. This causes data presented by the control data bus 42 to be loaded into the appropriate select register 41 and 141. The information in the select register is used to drive the associated line select matrix 51 or 151 which in turn connects the station set circuit 12 to the desired line. The selected line information is retained in the line select register 41 or 141 until it is updated by a new data word from the station sets. This storage allows the system to sequence from station set to station set in processing information. The content of the line select register is gated onto the data bus 42, along with other sources of light information, during the time that light information at 60 is being assembled onto the control data bus 42. At the proper time, this information is loaded into the shift register 37 on the system control card, to be transmitted via the control wire pairs to the station sets.

When the FIG. 8 system control card receives a "hold" signal from a station set, a hold strobe pulse will appear at 52. This pulse is used in FIG. 9 to override any loading of data into the select register. This is necessary because line select information is also coming from the station set that originated the hold command. This dual information is required for the operation of the hold circuit on the dual line card 19.

The motherboard wiring at central cabinet 13 determines the address of a particular dual set supervisor 14. This permits the address decode circuit on all of the dual set supervisors to be identical so that these cards are readily interchangeable.

Referring to FIG. 10 a dual line card 19 contains two of these illustrated circuits. The main functions of the line circuit are ring detection, holding, and display of the light data showing the conditions of the line circuits. The ring detector 62 is bridged across the tip and ring leads 63 and 64 of its associated central office line (trunk), so that the detector responds to the ringing voltage from the central office and rejects unwanted signals such as line interference, hook switch spikes and dial pulse spikes. The data output at 65 of the ring detector is maintained between rings by a timing circuit in 62. The timing circuit is reset when any station set in the system selects that particular associated line. The output of the ring detector is presented to the light data gate 66. When this output is coincident with the flash rate signal at 67 and the light data enable signal at 68 the proper data bit is presented at 69 to the system control card via the control data bus. This causes light data to be transmitted for one half second with a pause of one half second. This corresponds with the flash rate of the station set lights. The line ring enable signal at 71 allows the light data gate to operate during the collection of data for bell data transmissions. The bits in the transmitted data word are therefore the same for line ringing information as for light flash information. The difference, of course, is the frame of transmission in which they occur. The light data sequence for "hold" is identical to the operation just described for line ringing except the wink rate signal at 72 and the hold latch 73 are used as the source of data for gate 66a, corresponding to gate 66.

The "hold" latch circuit 73 is activated when the coincidence of a line data bit at 74 and the hold strobe signal at 75 corresponds to a particular lines hold circuit. The hold set circuit 76 continues to receive signals so long as the hold button on the station set is depressed. During this period, the hold latch is set to "On", which causes the hold relay 77 to bridge the holding circuit 73 across tip and ring via bridge 80. When this circuit is completed, the central office talk battery furnishes current to the current regulator and current detector. The current detector is optically coupled back to the hold latch circuit. The action of current through the current detector 78 is to NOT reset the hold latch via connection 79. This is necessary to maintain the hold latch during the period required to operate the hold relay and obtain a feedback from the current detector. This feedback removes the reset signal, in other words.

Once this hold latch arrangement is in the set condition and the hold set signal has ceased, any interruption in the central office talk battery will cause the hold latch to reset. The hold circuit relay 77 will then fall out. This corresponds to a held party hang-up. Also, the bridging of any other station set across tip and ring 63 and 64 will drop out the current detector 78 thereby re-setting the hold latch. This is the normal method of re-setting the hold circuit when someone seizes the line.

The dual line card circuit of FIG. 10 also contains provisions for use of the key system in the event of a power failure. This is accomplished by means of a Form B relay being connected across tip and ring. As long as power is present, this relay is energized and keeps tip and ring disconnected from the by-pass arrangement. When a power failure occurs, the relay de-energizers and tip and ring are fed directly to the designated station sets.

Referring to FIG. 11 the dial intercom card 21 supplies the talk battery 84 for the intercom path and it also provides signaling to the dialed station set. The talk battery 84 provides a constant current source with the proper impedance to battery and ground. The current detector 85 in series with the talk battery, permits the sensing of the off-hook condition and the dial pulses. The signal at 86 from the current detector is processed through pulse separator 87. This circuit removes any switch contact bounce and provides the control pulses at 90-92 for operation of the intercom circuits. The off-hook circuit has a long time constant; therefore, the dial pulses 90 will not interrupt the steady state condition of the off-shore signal 92 as long as any station set is off-hook. The dial pulse circuit has a much shorter time constant which enables it to faithfully reproduce the dial pulse timing sequence. The dial pulses are further treated to produce the inter-digit pulse 91 which signal the control logic circuit 93 when the required interdigit time-out has occurred.

The dial intercom card operates in the following sequence: All of the logic at 93 on the dial intercom card is held in the reset condition when the station sets are all on-hook. Therefore, when a station set goes off-hook, the counting register 96 is in the condition required for receiving pulses corresponding to the first digit dialed. After the first digit has been dialed, the inter-digit pulse at 91 causes the control logic 93 to control the register via connection 97 to direct the dial pulses 90 to the second portion of the counting register.

During the dialing time there can only be one station set off-hook or dialing could not proceed. The reason for this is that the current detector 78 in FIG. 10 would not sense the interruption of talk battery current by the dialing station set. During the interval between the two dialed digits, the fifth data bit supplied at 99 on the control data bus is sensed. The occurrence of the fifth data bit indicates the station address of the dialing station set. This condition causes a load pulse to be sent at 102 from the control logic circuit 93 to the calling station register 103 enabling storage of the dialing station set address data at 104 in the calling station register.

Upon completion of the dialing of the second digit, the control logic permits the coincidence of the intercom ring signal 100 and the data enable signal 101 to cause the contents of the station register 103 to be gated onto the control data bus. This information is merged with the proper control bits and sent out to all station sets. The key set adapter of the dialed station set then decodes the information in order to ring the station set ringers. The timing sequence for "intercom" ring in relation to the "line" ring is illustrated in FIG. 12. This ringing pattern continues until the call is answered.

Answered condition is indicated by the occurrence of the fifth data bit on the control data bus from any station, other than the calling station. If the fifth data bit is from any station set other than the one dialing, it will cause a reset as at 104, 105 and 106 applied to logic 93, and the ringing stops. The comparator 107 compares the address of the answering station against the calling station register 103. If the fifth data bit corresponds with the calling station, the comparator circuit 107 will inhibit the called party reset circuit 105 so that the fifth data bit from the calling station set is ignored. Ringing will therefore continue until either the call is answered or the calling party hangs up. The hang up condition produces a reset signal. During the ringing time, the control logic circuit produces a ring back tone at 108 which is superimposed onto the talk pair so that the calling party hears a tone.

The intercom tone adapter is an optional unit as seen in FIG. 13 which is attached to the dial intercom card of FIG. 11 through a board-to-board connector. The interconnection between the two cards is such that the dial intercom card operates in a normal manner when the intercom tone adapter is not used. When the intercom tone adapter is used, both rotary dial and tone dial station sets can be used on the same system. In this case, the dialed number detection circuitry which operates (dial intercom card or intercom tone adapter) depends on which type of station set is being dialed.

The interface between the two cards is concerned with the transfer of the tone detected digits directly into the counting register 96 and in the generation and use of certain sequencing signals. A tone present signal at 109 is used on the intercom card to advance the digit count logic 110. The completion of the dialing process causes the count/load line 111 on the intercom tone adapter to transfer the information to the counting register 96 on the dial intercom card. The called party off-hook signal is used as the reset signal at 112. The net result is that the tone dialing sequence causes a parallel transfer of the dialed number directly into the counting register of the dial intercom card.

A pre-amp circuit 113 is connected to the tip and ring circuit 114 and 115 on the dial intercom card. The preamp circuit 113 connects the balanced differential signal of tip and ring to a single ended signal at 116 which is then presented to the tone detectors 117. Only the numbers one through eight are used; therefore only six detectors 117 are required. The outputs of the tone detectors are fed to a digit encoder 118 which converts the dual tone system (DTMF) to a binary format at 120 which is compatible with the one produced in the counting register on the dial intercom card. The information 120 from the digit encoder is stored in a 4-bit latch 121 until dialing is complete. The tone present signal, which is sent at 122 to the dial intercom card, is used for sequencing to the "dialing complete" condition. Since the 4-bit number has been placed into the counting register 96 the circuitry on the dial intercom card produces the calling signals just as though dialing had been originated from a rotary dial.

A block diagram of the power supply is illustrated in FIG. 14. It produces a special 48 VAC high frequency voltage, as shown, which is distributed to all of the key set adapters. Each key set adapter contains a small ferrite core transformer. The transformer operates from this 48 VAC to produce the voltages required by the key set adapter. The main output transformer 130 on the power supply, has other secondary windings 131 and 132 which are used to produce the voltage required in the central cabinet.

The 117 VAC commercial power input at 133 to the power supply is rectified at 134 and filtered to produce 115 VDC. This DC voltage is used to power the oscillator/power amplifier combination 135. All of the circuits associated with the power line (rectifier, power amplifier, oscillator, and AGC circuits) are coupled to the power line wires as a reference. The output power transformer and an optical coupler 136 serve to isolate the incoming power line voltage from the voltage outputs to the key system. The oscillator is controlled and produces the signal that drives the power amplifier stage. The power amplifier produces approximately 100 watts of output power.

Voltage regulation is provided by a feedback, from the power amplifier, through the 5 VDC power supply 137, comparator 138 and optical coupler 136 to an AGC circuit 139. The output of the 5 VDC power supply is fed to the voltage comparator 138 circuit, which is referenced to a precision 5 VDC. The resultant drives a LED type optical coupler 136. The output of the optical coupler drives the AGC circuit 139 which regulates the voltage supply to the oscillator 140. The results is a closed loop feedback which maintains the required regulation.

A more complete discussion of the data transmission is given here before describing the details of the key set adapter 12. One complete frame of data transmission and return is detailed in FIG. 15. The total frame is divided into four phases (T0-T3). The first two phases are the active portion of the transmission. The last two phases are quiescent for synchronization purposes. The process begins when the system control card produces the start bit. During the T0 phase, the load control on the system control card causes the loading of a single bit into its last position of the shift resiger. This bit is shifted out immediately upon the first shift edge of the clock pulse (the positive going edge). The line marked "transmit data" illustrated that the start bit lasts for the period between two consecutive positive edges of the shift clock. The transmit data is then quiescent for the remainder of the T0 period. The start bit initiates the return data action when it is received at the key set adapter.

At the beginning of phase T1, a new load control signal occurs which is coincident with the "data enable" signal. This causes the shift register on the system control card to be loaded from the control data bus. The data enable signal gates the output of the various cards onto the control data bus. These outputs combine to make up the composite light or ring data bit pattern (word). Two flag bits are also loaded into the shift register. The last flag bit tells the key set adapter whether the data is light information or ringing information. The first flag bit tells the key set adapter whether the ringing information is "intercom ringing" or "line ringing". A strobe pulse is generated when the return information from the selected station set has been assembled in the system control card shift register. This strobe pulse occurs in the middle of the time period when the return data is available. This is the end of the T0 period. This strobe pulse is used to clock the return data into the appropriate dual line and dual station supervisor cards.

A block diagram of the key set adapter or station unit is illustrated in FIG. 16. The data transceiver 142 interfaces the data pair to the circuits within the key set adapter. The control logic 143 is triggered into action upon receipt at 144 of the first part of the transmit data frame (start bit). The start bit sets the control logic into the operate condition as illustrated in FIG. 15. The timing chain 145 is now allowed to run. The control logic, along with the timing chain, generates the T0 and T1 periods. The shift clock signal at 146 on the key set adapter is identical to the one on the central cabinet (FIG. 8) except that it is delayed by one half shift clock period. This difference optimizes data transfer. The start bit is also fed at 147 into the key set adapter shift register 148. Until this time the shift register has been held in the reset state, therefore it is cleared of all information. The start bit proceeds through the shift register as the T0 period progresses.

The receipt of the start pulse which is connected at 147 to the switch scanner is used to load the switch status into a shift register within the switch scanner 150. The clock signal 46 causes this data to be sequentially presented to the data transceiver where it is transmitted back to the control unit via the data pair as the Return Data Word, presented also in FIGS. 8c and 15. Light and ring information is then fed from the data transceiver 142 to the shift register 148 on the key set adapter. At the end of the T1 period the shift register will contain a complete data word representing either the light or bell information for that particular transmission frame.

The control logic and timing chain produce a load pulse at 152 at the end of the T1 period, which causes the register data to be strobbed into the proper circuit. It will be recalled that there are three potential uses for this data depending on the two control flags. The light/ring (L/R) flag (8th bit) will cause the data to be strobbed into the light register 153 during a frame associated with light data. This information is retained in the light register until it is replaced by a subsequent frame containing light information. The output of the light register is fed to the light driver circuit 154. The light drivers are capable of powering the lamps 154a in the station set and to which they are connected at 154b. The rate that information is put into the light register is sufficient to insure that the wink and flash rate is properly reproduced at the station set.

The bell circuits are responsive to the inverse state of the L/F flag; therefore a transmission containing bell information will be presented to the bell circuits at the end of the T1 period. The state of the intercom/line (ICM/LINE) flag (1st bit) determines whether the particular transmission is a line or intercom ring signal. The two decoders 155 and 156 associated with the line ring and intercom ring functions are responsive to the state of this flag. Depending upon which decoder is enabled, the settings of the associated switches 180, and the code transmitted, the bell driver 157 will be strobbed on.

The control logic 143 will be strobbed to its reset state, by the timing chain 145, at the end of the T1 period. This shuts down all operations within the key set adapter for the periods corresponding to T2 and T3 of the system control card timing chain. This period provides time for the synchronization of all key set adapters with the system control card during power start up. It also provides a re-synchronization period which minimizes malfunctions resulting from extreme external noise conditions during system operation. This re-synchronization takes place between every transmission sequence.

The Key Set Adapter power supply 160 contains a clock stripping circuit. This circuit insures that the timing functions within the key set adapter are in exact synchronization with corresponding functions in the central cabinet.

Tip and ring of the voice pair are brought into the key set adapter and pass directly out to the station set, as indicated at 161. Therefore, the total action of the electronics in the key set adapter is concerned with line selection, display of information and ringing the station set, but have no effect on the voice pair.

DETAILED DESCRIPTION OF SYSTEM CONTROL CARD

Referring now to FIGS. 8a and 8b, these circuits provide the timing, logic control, and data handling for the Central Cabinet; their functions are: to receive and process serial information from all stations attached to the system; to generate serial information to be sent to all stations attached to the system; to use the power supply frequency (49,152Hz) to generate all timing and control signals for the system; (all timing in the system is relative to the power supply frequency); to control all devices which supply information to the data buss and process this information; to supply information to other devices via the data buss and provide control signals which cause these devices to accept such information; and, to provide the power driver for sending serial information to all stations.

1.0 Timing Chain

The 49,152Hz frequency of the power supply is supplied to a series of Flip/Flop counters arranged as dividers. The input rate is divided down to one fourth Hertz (¼ Hz). Various control signals are derived from the timing chain by appropriate gating arrangements. This timing chain runs continuously and all systems functions are time referenced to it.

1.1 Clocks Squaring Circuit

The RAW CLOCK signal in FIG. 8b is derived from one of the power supply rectifier circuits. Its levels, rise times, and duty cycle are not critical. It is important that the waveform be free of glitches which would cause the squaring circuit (A6) to produce more than one output cycle per input cycle. The capacitor C2 is used to filter a low level glitch caused by the rectifiers response time.

1.2 First Divide By 16

The divide by 16 (A5) counter produces the shift clocks 3.072KHz and the 6.144 KHz gating term. The basic reason for the ÷ 16 is to provide a small increment in the synchronization of the station adapter to the start pulse from the Central Cabinet.

1.3 Divide By 32 (Circuits CT0 through Ct4).

This section of the timing chain provides the timing and control of the data transmission frame. See FIG. 8b. The first half of the period is active and the second half is quiescent. The quiescent time allows all associated station circuits to catch up if they are out of sync with the Central Cabinet. The signals derived from this section are associated with loading the shift register, shifting data processing data from it.

1.4 Divide By 16 (CT5 thru CT8)

This section provides the 4 bit address for processing information relative to the 16 stations. Also, certain functional signals are derived from this section.

1.5 Divide By 3 (CT9 & CT10)

The ÷ 3 allows data transmission rates which produce 24Hz ringing signals and line/ring periods (which are related to 1 second) consistent with standard key system. The wink rate is derived from this counter. Note that the IC package A20 is a ÷ 12 counter. The ÷ 2 section is used for CT4 and only the ÷ 3 section is used here.

1.6 Divide By 8 (CT11 thru CT13)

This section produces the ringing periods and the flash rate. It is held in the reset state until one of the ring detectors operates or the intercom dialing is complete. Based on the assumption that most of the time an incoming call will be answered before another one comes in, the one second ringing period begins when a call is detected, thus there is no delay in the bell.

2.0 Control Signals

A number of control signals are derived from the timing chain. Some of these are used only on the System Control Card and others are brought out to the edge connector for connection to other cards in the Central Cabinet. Where necessary, these signals are buffered with power gates. The Timing Diagrams, FIGS. 8d–8j show the details of these signals. The details of the use of these signals are given in the description of the associated circuits either elsewhere in this System Control Card descript or in the description of the cards which contain them.

3.0 Data Handling Circuits

Data handling is mostly concerned with data gathering, distribution, and the conversion from serial to parallel and visa versa. Additionally, certain control signals are developed based on the data present.

3.1 Serial Data In (Return Data)

The address lines A0 thru NA3 select one at a time each of the station adapters by means of the address circuitry on the respective Set Supervisor Cards. Data from the station is connected to the System Control Card on the common OR buss line RID. Refer to the signals RID and Data Out on the timing diagram of FIG. 8e. The flow of Return Data is initiated by the leading edge of the Start Pulse.

3.1.1 Data Pair Open Detector

At the beginning of T0 period the output of the data receiver on the Dual Set Supervisor card corresponding to the addressed station is connected to the RID terminal (pin 5) of this card. Since this is one half shift clock before the Start Pulse, there should be no return data present (low-true). However, if the data pair is open, the signal will be incorrectly low at this time. The clock developed by A7–12 will test RID at the leading edge of the Start Pulse and inhibit the flow of data into the shift register if it is low. This test will be performed for the data returned from each station in turn.

3.1.2 Shift Register Serial-In

At the beginning of T0 period the shift register is empty. At $t = 1.5$ the positive edge of the shift clock will sample the first return bit. This will continue for a total of 7 edges (where $t = 7.5$). The shift/load control is high during this time so that meaningless data is gated onto the data buss. From $t = 7.5$ to $8.5$ the return data is in the correct position for use.

3.2 Processing of Return Data

Once the return data is in position for correct parallel output, various circuits process this information.

3.2.1 Line Select Data

The outputs B, C, and D are connected to the decoder A25. If a line is being selected by the particular station that is being poled, the appropriate output of the decoder will go low. This will be inverted by the data buss gate and the data buss line (D1 through D5) corresponding to the selected line will go high. The LSR pulse (Load Select Register) goes true (high) from $t = 7.75$ to $8.0$. This pulse causes the data to be loaded into the respective line select registers as well as performing functions described elsewhere. If no selection is being made this operation will clear the line select register.

3.2.2 Busy

The outputs B, C, and D are also fed into a negative input OR gate (A28-12). All three of these outputs will be high for no line selection. If any of the three are low, the busy gate will be enabled. Since the return data will be valid up until $t = 8.5$ where the station data is loaded into the shift register, this bit will become part of the station data word. Note that this complete transaction occurs within one transmission frame so that a busy display system could decipher the station data.

3.2.3 Nite Mode F/F

The Nite bit (F output) is loaded into the Nite Mode F/F by LSR. This flip flop can be set by any station and thus hold its state for operation with line ringing signals. It is held reset during the last two seconds of the four second system cycle.

3.2.4 Privacy Release

This bit (E output) is connected to pin 17 for use on the Privacy Card.

3.2.5 Hold

The Hold bit (A output) is ANDed with LSR to form the strobe (H.S.). This occurs when the poled station has the HOLD button depressed.

3.3 Serial Data OUT (Station Data)

The station data is parallel loaded into the shift register and shifted out at the 3KHz shift rate. The shift register is loaded 96 times per second.

3.3.1 Loading

From $t = 8$ to $t = 9$ the load/shift control is low which causes data buss (D1 thru D5) and the appropriate function control bits to be loaded into the shift register. This also includes miscellaneous bits such as Nite and Busy.

3.3.2 Transmission

The shift clock edge at $t = 8.5$ loads the data and immediately begins the transmission at that time. Each shift clock advances the data to the last stage (H out) until at $t = 16.5$ the register is cleared.

3.3.3 Start Bit OR Gate

The data out (H out) is low-true. The shift register output and the start F/F outputs are ORed at (A17-3)

3.3.4 Data Driver

The output of the OR gate is fed to the cross coupled NAND gates (A22-3,6). The purpose is to provide a slight delay in switching from high to low and visa-versa. This prevents opposing drivers in the output stage (A26) from having a cross-over glitch. A26 contains two source and two sink transistors which are capable of 600 ma. These are arranged in two totem pole configurations to produce the two outputs LD & HD. The outputs HD & LD alternately switch between +15 volts and ground (within a few tenths of a volt). This action provides an AC balanced twisted pair driver. All station data pairs are driven through a pair each of 300 ohm resistors from this point.

3.4 Collection of Station Data

Station data consists of a Start Pulse during T0 and an 8 bit data word during T1. The 8 data word is a composite of information from other cards in the Control Cabinet along with function codes and miscellaneous information derived on the System Control Card.

3.4.1 Start Pulse

The Start Pulse F/F is enabled by the Start Pulse Enable signal and is set low by the shift clock at $t = 0.5$.

3.4.2 Start Pulse Squelch

Note on the timing Diagram II that the Return Data begins half way through the Start Pulse. Since Data Out overrides Return Data it is necessary to foreshorten the Start Pulse in order to sample the Return Data in the middle of its first cell time. Shorting the Start Pulse is no problem as only the leading edge is used by the station adapters.

3.4.3 Function Code Bits

The first and eight bits define the function of the particular station data word being transmitted. Which of the three basic words transmitted can be determined from the complete system cycle diagram along with its details. These bits are generated on the System Control Card, but are also a function of inputs from other cards.

3.4.4 Light Data

Light data is collected from several other cards. The data buss (D1 thru D5) is a collector OR arrangement. This property is used to form the composite data field which represents each of the five lights. Light data is transmitted a minimum of 48 times per second in a pattern of two light and two ring transmission. Part of the time it is transmitted at the full rate of 96 per second.

3.4.4.1 LDE

The primary use of LDE (Light Data Enable) is to gate the contents of the Line Select Registers onto the data buss. As a result, any line that is selected will contribute a data bit. The LDE pulse occurs for each light transmission so that the net results at the station set is a steady lamp indication for a selected line.

3.4.4.2 MWNK

The use of the MWNK signal is to gather light data for lines that are on "hold". MWNK is derived from LDE but has two 1/12 second skips per second. This pattern of pulses is used to interrogate the hold circuits for each line. Therefore, some light transmissions will contain data collected by MWNK and others won't. The result is that station lights corresponding to held lines will wink in coincidence with MWNK.

3.4.4.3 MFLSH

This pulse is used to gather light and ring data for lines that are ringing. The use of this pulse for ring data is described in paragraphs 3. 4. 5. The flash pattern is ½ second on and ½ second off. MFLSH is derived from LDE with this pattern superimposed so that the lights for ringing lines will flash at this rate.

3.4.5 Ring Data

Ring data is OR'ed onto the data buss (D1 thru D5) in the same fashion as light data. Line ring is gated by MFLSH because the source circuit for light flash and line ring is the same; namely, the ring detector. The strobing signal for intercom ring is generated on the intercom card.

3.4.6 Miscellaneous Bits

3.4.6.1 Nite Bit

The Nite Bit is transmitted along with line ringing data when the Nite MOde F/F has been set. A30-8 and A28-6 generate the Nite Bit. The data buss lines are ORed and tested during MFLSH. Thus, when any line rings, the Nite Bit indicates that one of the lines is ringing.

3.4.6.2 Busy

The generation of the busy information is described in paragraph 3.2.2. The output of 29-13 is fed back to the Shift Register input B.

3.4.6.3 Sync

The sync bit is used to allow remote devices to synchronize with the central unit return data poling scheme. It is transmitted along with light data when the central unit has just received data from station #15. The reset gate has a dual task; one of them is generating the sync bit. The reset bit is gated into the Shift Register input H by LDE.

4.0 Miscellaneous Circuits

4.1 ICM Enable

The ICM Ring Gate (A22-8) is disabled under two conditions: (1) There is no intercom card or (2) if there is a card, but the ring condition has not been met. The disabling of intercom function codes is necessary because if they were generated without proper data present there would be false ringing. The intercom card returns the signal ICM Enable only when it is ready to ring and ISEL is true. NISEL is used to enable a second interm card so that there will be no conflict between the codes generated by the two cards.

DETAILED DESCRIPTION OF DUAL SET SUPERVISOR CARDS

Section I — General Description

Referring now to FIG. 9a, this circuit switches the station voice pair and provides the individual data pair circuits for the station sets. It is a dual circuit. The Timing Diagram in FIG. 8d should be referenced. The circuit functions are: to provide the matching impedance between the data driver on the System Control Card and the station data pair; to provide the data receivers for return data from the station sets; to provide the Line Select Registers corresponding to the associated station sets; and, to provide the relay switch matrix for the associated station set.

Section II — Detailed Description

1.0 Address Circuit

The system can be implemented with up to 8 Dual Set Supervisor Cards for a total of 16 stations in a system. The address circuit selects one of these stations for return data and the associated Line Select Register.

1.1 Decoder

A3 is configured in a 1 to 16 decode arrangement. A3-11 and A3-3 select 1 of 8 cards. The last address bit (A0, NA0) selects 1 of 2 circuits on the card. The three higher order terms have dual terminals. The back plane wiring is arranged to pick-up these terms so that the card address is peculiar to the slot and not to the card itself.

1.2 Strobe Pulses

The two strobe pulses LSR & HS are received at the card by the differential receivers (A14). The pulses are qualified by the address circuit output.

2.0 Data Circuit

The return data receivers are selected by the output of the address circuit. This selection is valid for the full transmission frame corresponding to the addressed station set. Refer to the system control card timing Diagram of FIGS. 8e and 8f.

2.1 Transmit Circuit

The purpose of the resistors R1 through R4 are:

2.1.1

To connect the data pairs to the data driver on the System Control Card. The data sent is the same for all stations;

2.1.2

To provide isolation between the data pairs for individual return data and in the case of short circuits, etc; and

2.1.3

To act as a current source to minimize the effect of loop resistance change;

2.2 Receive Circuit

The receive circuit is selected by the address decoder output. When selected its output is gated onto the buss line RID (pin 5). This is a collector OR point for all cards in the system. The data is low-true.

2.2.1 Receive Operation

When data is being transmitted from the Central Cabinet, the data pairs will be terminated at the station in a very low impedance (less than 100 ohms). For this reason the voltage will never be high enough across the data pair to operate the Central Cabinet receiver. Data is returned to the Central Cabinet by opening the circuit at the station set end. The data return is timed so that HD will be positive with respect to LD. The voltage across the data pair will then rise until current flows through the coupler LED. This causes the input to the Schmidt Trigger to go low and thus presenting a high-true signal to the open collector NAND

3.0 Line Select Circuit

After the serial data is received from the selected station it is presented in parallel to the data buss (D1 thru D5) by the System Control Card.

3.1 Line Select Register

The LSR pulse always occurs and will cause the data to be loaded into the Line Select Register. If the return data does not contain a select request, the Line Select Register will be cleared by the null data. If the return data contains a hold request, the H.S. pulse will be present along with LSR. The H.S. pulse is gated into the clear terminal of the Line Select Register. This will override any data inputs and will leave the register cleared.

3.2 Switch Matrix

The output of the Line Select Register is connected to the relay drivers. The relay corresponding to the data is caused to operate. The five lines are respectively connected to the five relays. The other side of these relays are connected together to form the voice pair to the station set.

4.0 Light Data Circuit

The output of the Line Select Register is also connected to the open collector NAND gates. When LDE occurs, the line busy status is gated onto the ORed data buss (D1 thru D5). At this time all stations will have their data ORed onto the buss so the result is the busy status of the lines.

DETAILED DESCRIPTION OF DUAL LINE CARD

Section I — General Description

1.0

Referring now to FIG. 10a this dual line card circuit provides the interface between the present system and the existing central office lines. Functions are: to detect the presence of a ringing voltage across the C.O. line and provide line status data to the data buss in response to the signal MFLSH; in response to a hold command to place a holding impedance across the C.O. line and provide line status data to the data buss in response to the signal MWNK; and to provide for the release of the holding impedance if the line is selected by any station or if the held party hangs-up.

Section II — General Description

AL1 schematic references in the description below refer only to the odd numbered line circuit since there are two identical circuits per card.

1.0 Ring Detector

The Central Office presents an approximately 90 volt 20Hz signal for about 1 second with an interval of 3—6 seconds.

1.1 Optical Coupler

The LED of A1 is set to respond to the presence of the ringing voltage. The series resistor R5 and capacitor C1 set the effective threshold for the detection of ringing voltage without causing a false load on the line. The capacitor C1 makes the circuit similar to a normal bell where there is no D.C. load back to the C.O. for "on-hook" conditions. The diode D9 protects the optical coupler during the negative half cycle of the ringing voltage.

1.2 Noise Reject and Time-Out Circuit

The level detector (A3-5) has dual thresholds at 3.33 volts for turn on and 1.66 volts for turn off (1.66 volts hysterises). The capacitor, C5, is normally charged to +5 volts keeping the output A3-5 at the low state. When the LED of coupler A1 goes on, the output collector goes to ground. This begins to discharge C5. Noise on the line will be ignored. When the ringing signal lasts long enough, the voltage at C5 will drop to the lower threshold so that output of the detector goes higher. During the interval between rings, the capacitor C5 starts to charge back up to +5 volts. The time constant of R8 and C5 is set so that the upper threshold will not be reached between ring signals. If the incoming call is abandoned, the time out will occur in about 2 ring intervals. The output A3-5 remains at a steady high state during the time that ring signals are present.

1.3 Line Select Squelch

The F/F A9 is clocked by LSR and has the associated Data Buss line connected to its "D" input. When any station selects that particular line, the F/F will be set on. The open collector A7-6 will turn off allowing a very fast charge of C5 through R9 & D8. This causes the output of A3-5 to go low.

1.4 Data

The ring detector output is gated to the data buss line when MFLSH occurs. This is both for light and line ring data.

1.5 Ring Cycle Control

When the ring detector is high, the gate A14-4 clamps RCC, the common reset line, low. This allows the ring interval counter on the System Control Card to begin its timing period. The effect of this is that the bells at station sets which are set to ring on this line will begin ringing immediately when the ring detector operates.

2.0 Hold Circuit

2.1 Hold Bridge

When the hold relay K3 operates, the hold bridge circuit is placed across the C.O. tip/ring pair. This maintains the supervisory current when the station set goes on-hook.

2.1.2 Current Regulator

The voltage regulator Q1 is arranged in a constant current configuration to maintain a 23 ma maximum hold current. It automatically adjusts to the loop length.

2.1.2 Latch Feedback

The coupler A11 is part of the latching circuit for the hold relay K3. After the relay closes, there must be a current developed through the LED in order to maintain the relay operated.

2.1.3. Bridge Dropout

When a station selects a line that is on hold, the voltage across the tip/ring pair drops to the point that the current through the LED will no longer maintain the latch. Relay K3 will then remove the bridge from the tip/ring pair. The zener diode insures that the current drops rapidly to the drop-out point.

2.2 Hold F/F

The data buss line is connected to the "D" input of the hold F/F (A9-9). The F/F is clocked by the Hold Strobe (H.S.) signal. This F/F will remain on until a signal is received from the hold bridge optical coupler (A11). The gate A10-13 combines the feedback signal with the reset to turn off the Hold F/F.

2.3 Hold Latch

The hold latch consists of the relay K3, coupler A11 and inverters. The Hold F/F drives the open collector A7-2 to ground energizing the relay K3. This places the bridge circuit across the tip-ring pair. The C.O. battery current flows through the LED of the coupler (A11) which drives the collector (A11-5) to ground. The double inversion drives A7-4 to ground. The contact of K3 is closed so that the feedback will maintain the relay latched when the Hold F/F resets. The hold latch is broken when the LED current drops due to either a station set being bridged across the tip/ring pair or the C.O. breaking talk battery.

2.4 Hold Data

The output of A8-4 is a high true signal for the Hold condition. This is used to produce light data when MWNK occurs.

DETAILED DESCRIPTION OF DIAL INTERCOM CARD

Section I — General Description

Referring not to FIGS. 11a and 11b, this Dial Intercom Card circuitry provides the local talk battery and rotary dial signaling for the intercom link. It also operates in conjunction with the Tone Decoder Card to provide tone dial signaling. Functions of the circuit are to provide the local talk battery for the intercom link; to provide means for detection of the rotary dial pulses and the off-hook conditions; to provide means for interpretation of the rotary dial pulses; to generate the ICM Ringing data for inclusion in the station data word; to stop ring generation once the call is answered; and to provide means for operation in conjunction with the Tone Decoder Card, Fig. 3a.

Section II — Detailed Description

1.0 Voice Pair Interface

1.1 Talk Battery

The intercom link on a key system is not connected to a C.O. line so it is necessary to supply a local talk battery. When the ICM card is installed in place of a line circuit the station sets are connected to this talk battery when this line is selected. The talk battery consists of two current regulators; one sourcing current from the +15V supply and the other sinking current to the −15V supply. The current is set at about 30 ma.

1.2 Loop Current Detector

The loop current supplied by the talk battery passes through the LED of coupler A4. Therefore, the off-hook and dial pulse breaks in current are monitored by this coupler. The output of the coupler A4-5 is squared up by the Schmidt Trigger A3-8. The signal (high) at TP4 represents the loop current.

1.3 Signal Separation

1.3.1 Dial Pulse

The output of A3-8 is connected to the retriggerable one-shot A5-4. The clock frequency is supplied to the other input. This particular signal is used because it is available. The time out of the one-shot is set short compared to the dial pulse length but long compared to contact bounce of the phone's rotary dial. The one-shot fires when loop current is first detected and continues to retrigger as long as this signal is present. When the loop current signal falls out, the one-shot will begin its final time out. Any contact bounce will occur within this time-out interval and simply restart the time-out period. The net result is that the output A5-4 will go low for off-hook and go high for each dial pulse.

1.3.2 Interdigit Pulse

The one-shot A6-12 will trigger on the positive going edge of the dial pulses. Its time outs are about 2 dial pulse intervals. The output A6-12 will go low during the receipt of dial pulses. The positive edge at the end of dial pulsing marks the end of a digit.

1.3.3. Off-Hook

A5-5 operates identically with A5-4 except the time-out is longer. The Q output A5-5 goes high for loop current and remains high during dial pulsing because of the long time-out.

2.0 Control Logic

2.1 Dial Sequence Register

The F/F's A10 control the operation of the logic on the ICM card. They are reset to their initial state by the on-hook condition or the call being answered. The off-hook signal release them for operation. The connection is essentially a shift register where the interdigit signal is the shift clock. The initial state is First Digit and Dial Not Complete. The positive edge of the interdigit pulse advances the first F/F to the second digit. The next positive edge advances the second F/F to Dial Complete. The tone present signal from the Tone Decoder card has the same effect.

2.2 Data Buss Gate

At the end of the dialing sequence the dialing register will contain a five bit binary value as a function of the digits dialed. At the proper time this value is gated onto the data buss for inclusion in the intercom ring station data word. The gate enable signal is derived by 4 input AND (A13-8 & A3-4). The inputs are: Lights/Ring Flag, Intercom Ring, Data Enable and Dial Complete.

2.3 Call Answered

It is necessary to cancel the intercom ring signal once another station picks up on the intercom line. The gate A8-6 monitors the data buss line D5 for return data from some other station and generates a pulse from LSR to reset the Dialing Sequence Register upon receipt of this signal. However, the function of this circuit is inhibited during the receipt of return data from the calling station (See paragraph 2.4).

2.4 Calling Station Inhibit

During the time interval between the first and second digits dialed the gate A13-6 responds to data from the calling station to generate a pulse from LSR which clocks the calling station register (A7). The 1's complement of the station address is present at the input to the register so that register will be loaded with calling station address. These clock pulses continue for the full length of the interdigit time (at the rate of 6 per second). Once the dialing is complete the calling station address remains in the register. Note that this is the only return data possible during the interdigit time as only one station can be off-hook during the dialing process. The comparison of the stored address and the actual address results in a signal at A3-10 which is true (high) for all address of the system scan except for the station that did the dialing. As explained in paragraph 2.3 this prevents the return data from the calling station from resetting the Dialing Sequence Register.

3.0 Dial Pulse Counting Register

A12 & A18-9 form a dial pulse counter than can be parallel loaded from the Tone Decoder Card.

3.1 First Digit Counting

The dial pulses will be directed into A18-11 by the gate A11-6 under the control of the dialing sequence register. A18-9 will carry into A12-5 for the highest order bit. For the first digits of 1 or 2 pulses (zero is actually 10 pulses) the count will be (0,1) and (1,0) (D5, D4) respectively. The dial pulses from the second digit will thereafter be directed to the second digit portion of the counting register by the dialing sequence register.

3.1.2 3 or More

For first dialed digits of 3 or more the operation is the same until the third dial pulse is received. This pulse advances the counter to (1,1). The NAND gate A17-8 will be satisfied and will set the F/F A10-9 to its second digit state. This causes the remaining pulse, if any, to go into the second digit portion of the counting register. Thus at the end of the first digit the sequence logic will advance to dial complete. The resultant binary values shown on page Y will be gated onto the data buss. Therefore, there are eight numbers that can be dialed as single digits. The number in the first digit portion of the register is (1,1) and the number in the second digit portion of the register is 3 less than the number dialed.

3.2 Second Digit Counting

For two digit dialing (where the first digit is a 1 or 2) the sequence logic directs the second dialed digit into second digit portion of the dial counting register.

4.0 Miscellaneous

4.1 Tone Decoder Compatibility

When the Tone Decoder Card is installed either rotary or tone dialing are operative on the same system. The sequence and control logic on this card controls both cards.

4.1.1 Tone Present

This signal has the same nature as the interdigit. It debounced by the one-shot A6-4.

4.1.2 Parallel Data Load

The terminals T1 thru T5 present the binary results of the Tone Decoder Card. The Load/Count Signal causes a jam transfer of this data into the Dial Counting Register.

4.2 Power Supply

In order to provide a clean signal for the talk battery there is a separate power supply to deliver H5V and −15V. The 48 volt 49KHz frequency is used as a source.

DETAILED DESCRIPTION OF TONE DECODER CARD

Section I—General Description

Referring now to FIG. 13a, this circuit provides the option of tone and rotary dialing when this card is installed in the system along with the Intercom option of FIGS. 11a and 11b. Its function is to provide the detection of MTDF signals on the intercom path; to covert the detected tones into Binary Digital Codes compatible with those produced by the (rotary) Dial Intercom Card; and to provide control logic which causes this card to operate in conjunction with the Dial Intercom Card.

Section II—Detailed Description

1.0 Input Amplifier

The differential amplifier provides a single-ended output from the balanced tip/ring pair while maintaining the balance on the pair. The gain is 0.1.

2.0 Tone Decoder

There are two pre-packaged tone decoders installed on the card. One for the four high tones and one for the four low tones. The output of the differential input amplifier is coupled to both of these. They each contain amplification, filtering and tone detectors required to meet the specifications in Section III. The outputs are high-true open collectors. Output pull-up resistors are required.

3.0 Number Conversion

When a number is being dialed, one output from each detector will become active. The two input NANDS (A8, A10, A7-11, A7-8) are arranged to convert these pairs of tones into 10 unitary low true signals. These signals are connected to the priority encoder A11. The output is a BCD digit (low-true).

4.0 Control Logic

The description of this section is done by means of following the sequence of operation for the two major conditions; namely, one and two digit dialing. In both cases the tones must be detected and converted to compatible formats, cause the sequencing of the Dial Intercom Card, and jam the results into the dialing register of the Dial Intercom Card.

4.1 One Digit Dialing

When the first digit dialed is not a 1 or 2 the dialing will be complete at the end of the first digit. For rotary dialing the first three pulses go into the first digit portion of the register and the remaining pulses go into the second digit portion of the register. Therefore, the register contains the number "3" (1,1) for T5 & T4 (first digit portion) and the number dialed less 3 in the second digit portion. The tone control logic must produce the same result.

4.1.1 Sequence of Operation

When a pair of tones is detected, at least one of the encoder (A11) outputs will go low producing a high output from A12. This signal is inverted and sent to the Intercom Card for debounce treatment the same as rotary dial signals. This signal comes back on pin 5 as D TONE. The gate A5 requires tone present, but not a "1" or "2" during the first digit. The process begins when these conditions are met by A5-8 going low. The F/F A3-5 is set and its output drives T4 high (1). The output of gate A6-8 is also held high for the other bit (T5). The output of A5-8 is inverted and applied to the B1 & B3 inputs of the Adder A4. The inputs B1, B2, B3 are respectively 101 which is the two's complement of "3". This produces a result at Σ1, Σ2, Σ3 which is the output of the encoder A11 minus three. This is the desired number for second digit portion of the dialing register (T1, T2, T3). At this moment all five bits (T1 thru T5) that are connected to the Dial Intercom Card have the correct value for single digit dialing. The load pulse must now be produced. The leading edge of D TONE (pin 5) is delayed long enough to allow all operations just described to settle out. The one-shot A3-13 produced a short strobe pulse at the leading edge of D TONE. All the conditions for gate A5-6 are met: i.e. a first digit that is not a 1 or 2. The pulse is fed through A6-3 and A6-11 to cause the parallel transfer of the bits T1 thru T5 into the dialing register of the Dialing Intercom Card. When the TONE present signal stops, the dialing will be completed just as though rotary dialing had occured. The one exception to the above is for a first digit of "0" to occur. The output of the encoder is 0, 0, 0. The rotary dialing results would have been 1, 1, 1, (7). The inverter A9-6 sets the B2 input to a (1) so that the outputs Σ1, Σ2, Σ3 respectively are 1, 1, 1 as desired.

4.2 Two Digit Dialing

When the first dialed digit is a "1" or "2" it is necessary to dial another digit before dialing is complete. The binary result for each digit corresponds the pulses of the digits dialed.

4.2.1 Sequence of Operation

The OR A12 produces a TONE present signal. Since the first digit is a "1" or "2" the gate A5-8 is inhibited. If the first digit is a "1" the F/F A3-5 is clocked to the reset state. This produces the codes for T5, T4 as 1, 0. If the first digit is a "2" the results will be 0, 1. Note that D TONE leading edge caused a strobe pulse but this is blocked both at A5-6 and at A6-6. The trailing edge of D TONE causes the F/F A3-9 to reset. This enables the A6-6 so that the strobe pulse caused by the second digit will pass through to become a load pulse. Note that the inputs to the adder are 0, 0, 0 for B1, B2, B3 and that the second digit gets loaded into the dialing register unmodified.

DETAILED DESCRIPTION OF POWER SUPPLY CARD

Section I—General Description

Referring now to FIG. 14a, it will be noted that the power supply is somewhat unusual in that power distribution is done at 49.152KHz. There are two reasons for this
(1) The 49,152Hz signal is used as a system clock.
(2) The multiple voltages required by the Key Set Adapter (see FIGS. 16a and 16b) are easily derived by means of a small ferrite transformer.

Had DC power been used, costly DC-to-DC transformation circuitry would have been required at each Adapter. The power supply supplies 48 volts AC to the Adapters via one pair of the three pairs of connecting wires. In addition, 5 volt and 15 volt supplies are derived for use in the central equipment.

2.0 Block Diagram Description (Refer to FIG. 14)

2.1 Input Rectifier-Filter

117 Volt 60 cycle power is supplied to a rectifier-filter combination and develops approximately 115 volts DC. This DC voltage is used to power the rest of the power supply board.

2.2 Oscillator

The oscillator is a Colpitts type, oscillating at a frequency of 49.152KHz. Its amplitude is controlled by a feedback loop controlled by the 5 volt DC output.

2.3 Power Amplifier

The oscillator is transformer coupled into a power amplifier operating Class B. This is a standard push-pull transformer output power amplifier with feedback from the output transformer to minimize distortion. The power transformer has three outputs:
(1) 48 volts AC which is distributed to the adapters.
(2) Approximately 15 volts AC which is rectified and filtered to provide 15 volts DC to the central unit.
(3) Approximately 8 volts AC which is filtered, rectified, and regulated, to provide 5 volts DC to the central unit.

2.4 Regulator

A regulating feedback loop compares the 5 volt DC to a reference voltage and, through an optical coupler, controls the amplitude of the oscillator. The output transformer is designed such that when the 5 volt output is correct, the 15 volt and 43 volt outputs will also be within specification.

Section II—Detailed Description

1.0 Rectifier and Filter

117 Volt 60 cycle is supplied to the power supply through F1, a 2 amp fuse, and R14, a 3 ohm 10 watt resistor. The purpose of R14 is to limit surges at turn-on. The AC is rectified by a bridge consisting of diodes D11 through D14. The rectified voltage is filtered by a 25,000 microfarad, 200 volt capacitor located in the central unit. The DC voltage across this capacitor is approximately 115 volts.

1.1 Oscillator

The oscillator consists of Q3 operating into a tank circuit made up of the primary of T1 and capacitors C1 and C2. Q3 operates in the grounded base mode. R1 and R6 provide bias current to the oscillator transistor Q3. C3 establishes the base of Q3 at AC ground. Feedback to sustain oscillation is supplied from the junction of C1 and C2. The tank circuit resonates at 49.152KHz. Q5, in series with the supply voltage to the oscillator, shuts down the oscillator in the event of over-current conditions. This protection circuitry is described in a later section. Oscillator amplitude is controlled by Q4. R9 and R16 provide a bias network sufficient in themselves to saturate Q4. The transistor portion of the AC optical coupler acts to shunt some of the base current to Q4. Thus the degree of conduction of Q4 is controlled by the optical coupler. C4 and C7 are filters to insure that the emitter circuitry of Q3 is at AC ground. R15, a 100K resistor, establishes the minimum oscillator current. Without R15 it is possible for the entire regulating loop to be stable at output voltages lower than the design values.

1.2 Power Amplifier

The secondary of T1 is center-tapped and provides base drive to Q1 and Q2, the power amplifier transistors. The secondary windings of T1 are in series with and opposing feedback windings on the power output transformer. R2 and R3 provide damping to insure stability. Emitter resistors R4 and R5 provide a small amount of current feedback which helps to linearize the power amplifier. 115 Volt DC is provided to the collectors of Q1 and Q2 through the center tap of the primary winding on power output transistor T2. Secondary winding 7-8 of T2 provides 48 volts AC to the adapters.

1.3 15 Volt DC Supply

Secondary winding 13-6 of T2 provides approximately 15 volts AC to a bridge consisting of diodes D2 through D5. The full wave output of the bridge is filtered by C5 and C6 and is provided to the central cabinet. The series network consisting of R20, the LED portion of A4, and R21 provides current sensing for the 15 volt output. The transistor portion of optical coupler A4 will be discussed in Section 3.6. In addition to supplying power to the central cabinet, the 15 volt output is fed to a three terminal regulator A1 to provide a 5 volt reference for the regulation loop.

1.4 5 Volt DC Supply

T2 secondary 9-10 provides about 8 volts RMS to a bridge consisting of diodes D6 through D9. Current from this bridge, after passing through a current sense circuit similar to that in the 15 volt supply, is filtered by capacitors C8, C9, and C10. This voltage is fed to the non-inverting input of operational amplifier A2 where it is compared to the 5 volt reference voltage supplied by A1. The resulting error signal establishes a current through the LED portion of optical coupler A3. The level of this current determines the degree of conduction of the transistor in optical coupler A3 and thus controls the amplitude of the oscillator. R13 converts the op amp output to a current and R24 sets the gain of op amp A2 at 100.

1.5 Protection Circuitry

Over-current limiting in the 15 volt DC supply and the 5 volt supply and an over-voltage circuit in the 5 volt supply protect the KTS-1 circuitry in the event of power supply malfunction. Optical couplers A4 and A5 have their transistors across R17, bias resistor for Q5. Excess current through either of the LED's in A4 or A5 will cause base current for Q5 to be shunted thus shutting off Q5 and turning off the oscillator.

DETAILED DESCRIPTION OF KEY SET ADAPTER

Section I—General Description

Referring now to FIGS. 16a and 16b, the illustrated circuit provides the electrical interface between a standard Key telephone (such as the 564) and the 3 pair station wiring of the present system. Functions of the circuit are: to transmit and receive data over the data pair; to provide the proper drive for the lights and the bell of the attached phone in response to data received; to provide the proper interpretation of data received relative to the programming switches; to generate the return data as a function of the various user operated switches (line select etc.); to use the AC power 49,152Hz to provide circuit power and synchronize the circuit operation with the Central Cabinet; and to provide proper connection to the standard 50 pin Key telephone set-tail connector.

Section II—Detailed Description

1. Data Transceiver

1.1 Receiver

The data pair terminates in the optical coupler A8. The diode D2 protects the coupler when the data state is reversed in polarity to the coupler. The quiescent condition is reverse so that this coupler is normally off. Whenever the Central Cabinet data driver reverses, the LED lights, causing the output collector to go low. The Schmidt Trigger squares and inverts this signal. The term maded "Data" goes high for the START BIT which corresponds to a true sense for the data.

1.2 Transmit

The LED of the coupler A9 is normally on. This means that the transistor Q1 is also normally driven into saturation. Thus, the back-to-back arrangement of Q1 and D3 provides a short circuit when the adapter is receiving data. Data is only transmitted back when the Central Cabinet data driver is in the condition of HD more positive than LD. To transmit Return Data the LED of A9 is turned off for each data cell that is in the true state. Q1 will then shut-off and interrupt the current flow in the data pair. The data pair is fed by equal value resistors (300 ohms) from +15 volts and ground. The net result is that the voltage excursions of LD & HD will be equal and opposite maintaining an AC balance. The receiver in the Central Cabinet will respond to this condition.

2. Synchronization & Timing

2.1 Clock Stripper

The cathode of D8 sees a half wave rectified signal at 49,152Hz. The level goes from slightly negative to about 20 volts positive at the sine wave peak. The input to the Schmidt Trigger A13-13 sees a voltage of about ground in one state to about +5 volt in the other state. The Schmidt Trigger squares this into a cleam signal suitable for driving the counter chain. The duty cycle will not be 50% but there will be only one cycle of output for each cycle of input.

2.2 Counter Chain

Before the Start Pulse occurs, the counter is held in the cleared state so that all outputs are in the low state. When the lock-up circuit is released by the Start Pulse, the counter begins to count at the power supply frequency. The timing signals developed from this counter are similar to the Central Cabinet signals except that they are 8 counts later. The fact that the driving clock for both is derived from the same power supply maintains a close phase relationship once the counter is started. There are only two signals derived from this counter: the Shift Clock and the Load Pulse. Note that the first positive edge of the Shift Clock is delayed 8 clock cycles from that of the Central Cabinet. This positions the sampling edge of the shift clock in the middle of the data cells as they arrive from the Central Cabinet. Also, it causes the return data to arrive at the Central Cabinet so that shift clock there samples in the middle.

2.3 The Lock-Up Circuit

The action of the Lock-Up Circuit and the counter in response to the clock frequency is to end up in the reset or locked state. This requires about half of the time between the expected arrival of successive Start Pulses. Under the worst conditions, it would take only two transmissions for this circuit to synchronize with the Central Cabinet. The positive going leading edge of the Start Pulse clears the F/F A1-5 which remoes the reset signal from the counters and the shift register. The counting continues until the 8 input NAND A2-8 is satisfied. The low signal first disables the other term of the AND (A4-3) and then sets the F/F A1-5. The net result at the output of A4-3 at this moment is zero. However, when the clock advances the counter, the other input term of the AND gate (A4-3) will go true which satisfies the AND gate, causing the output to go true. A unique condition exists in that this reset action simply holds the counter in the state that is had just arrived; namely, the zero condition. This avoids the logic race problem. The circuit will remain locked until the next positive edge of DATA which should be at the next Start Pulse.

3. Data Flow

Refer to FIG. 8c for the Data Formats.

3.1 Return Data 3.1.1 Switch Information

The line select switches and the special purpose switches are monitored to make up the return data word. The bits which represent each switch are shown as follows:

| LINE SELECTED | A2 | A1 | A0 |
|---|---|---|---|
| 1 | 1 | 1 | 0 |
| 2 | 1 | 0 | 1 |
| 3 | 1 | 0 | 0 |
| 4 | 0 | 1 | 1 |
| 5 | 0 | 1 | 0 |
| none | 1 | 1 | 1 |

The five line select switches are encoded into the three bits A0 through A1. The remaining switches could not be encoded along with line select because they must be independent as they may or may not be transmitted simultaneously.

3.1.2 Return Data Shift Register

The Shift Register (A7) has a quiescent condition of a high output. This causes the return data LED to be on. The inversion of the Start Pulses is used as a load control. The load control will, therefore, be low during the first positive edge of the Shift Clock. This loads the Shift Register at $t = 0.5$ and immediately begins the transmission of return data. This continues with each positive edge of the Shift Clock until $t = 8$ where the signal CT 8 will inhibit the loading of any more data. The Shift Register output is left in the high state.

3.2 Station Data

Beginning at $t = 8$ the Central Cabinet sends the data required for the adapter circuits. This information is fed serially into the shift register (A6), analyzed and used to cause the appropriate action.

3.2.1 Station Data Shift Register

Before the arrival of the start pulse the shift register A6 is held reset. The start pulse will be loaded into the shift register and then it steps down through the register during TO phase (but this will be of no consequence). At $t = 8$ the station data will begin to shift into the register. When the load pulse occurs at the end of the last (t) period, the data will be in position at the shift register outputs. The load pulse is used to take action on the assembled data word. Inverted data is fed into the shift register. This inversion simplifies the processing functions described below.

3.2.2 Light Data

The last bit eceived (L/R) will be true for light data. This enables the gate A4-11 so that the light data will be parallel loaded into the Light Data Register. Only those transmissions containing light data will be thus loaded. The light data register stores the previous information until it receives a new load pulse.

3.2.3 Ring Data

The L/R bit will enable the bell F/F gate A15-8 for bell information transmissions. The results of one of the two decoders will then determine if the bell rings. Note that the Bell F/F A1-9 is always set for any transmission which does not reset it. Transmission for bell ringing always alternate between two for bell and two for lights. This will cause the bell F/F to produce a 24 Hz square wave. See FIG. 5 for the bell ringing switch settings.

3.2.3.1 Line Ring Decoder

When the ICM/Line bit selects the Line Ring Decoder its output is connected to the bell F/F gate A15-8. The Line Ring Decoder is a negative input OR gate. The inputs are connected to the Shift Register outputs through the programming switches. Therefore a bit and its associated switch must combine to produce a ring signal. Any combination of switches may be selected as they all operate independent of each other.

3.2.3.2 ICM Decoder

The intercom information is in binary form so that it is necessary to use a digital comparator to decode ICM ring information. When the bit pattern corresponds to the switches and the ICM/Line bit selects the ICM decoder a true will be presented to the bell F/F gate (A15-8).

4. Miscellaneous Circuits 4.1 Bell Driver

The Bell is a capacitive load for the steay DC condition. It is necessary to drive it with a totem pole type circuit to charge and discharge the capacitor. The normal condition is for Q4 to be on. When the bell F/F switches state, Q4 will go off and Q3 will go on. This presents a 150 volt p-p square wave to the bell terminals.

4.2 Power Supply

The supply produces 10 volts for lamps, 5 volts for logic and 150 volts for the bell. The transformer is a balanced load for the power pair. The one chip regulator A19 supplied the +5 volts from the +10 rectifies output.

DETAILED DESCRIPTION OF PRIVACY CARD

Section I—General Description

Referring to FIG. 17, the illustrated circuit is an option which provides exclusive use (privacy) of a CO line to the station which initially seizes the line. It also provides means for the release of privacy for adding other stations to the conversation. Its functions are to monitor the flow of data on the data buss to determine the activity on the lines; to remember which station initially seizes a line; to quelches data from any other station once a line is in use; to monitor the return data from the station which initially seized a line for the privacy release bit and defeats the feature once this bit is received; and after a privacy release function has been set and subsequently all stations go on-hook, to restore the privacy feature automatically.

Section II—Detailed Description

1. Method of Operation

There are five independent circuits - one for each line. The last two (lines 4 and 5) may be operated with intercom circuits. These two may also be defeated where privacy is not desired with intercom. Each circuit contains a counter which automatically syncs with the station address that seized the line. The circuits associated with the counter clamps line select bits from other stations to ground and prevents a selected. Reference below is to only of the five circuits (line 5).

2. Station Counter & Sync

The 4 bit counter A12-8 is clocked by the Station address advance. The counter advances until the negative input AND A20-8 is satisfied (count of 15). The transition to this count clocks the F/F A11-6 to its reset state. This F/F will then hold the counter at the count of 15. Whenever data buss line D5 goes high at LSR time the F/F A11-6 will be set. At the end of this transmission frame (corresponding to the station which seized the line) the counter will advance. The counter will advance until it goes back to the reset (locked) state at the beginning of the frame for the seizing station. The line select bit from the seizing station will again resync the counter. The action repeats as long on the seizing station remains off-hook.

3. Data Squelch

The output of A21-8 will be high for all station addresses except the seizing station's. Note that the third term for the gate A13-8 is effectively LSR. It is in fact LSR for lines 1 thru 3. Assume for now that the output of the Privacy Release F/F A11-8 is true (see paragraph 4.). This provides an all true input for A13-8 which clamps D5 to ground during LSR. As a result all stations except the seizing station are prevented from selecting that line. The special term ICTRL provides a means whereby the intercom card allows a second station on without releasing privacy. If this term is grounded the privacy feature is defeated completely.

4. Privacy Release

If the seizing station sends the Privacy Release bit (PVRL) the gate A19-2 will be satisfied and will set the Privacy Release F/F (A11-8). This will inhibit the Squelch Gate A13-8 and thus allow any station to seize the line.

5. Privacy Release Reset

The input terms of the gate A4-8 are satisfied when light data for that line is not present. This occurs when all stations release the line. The Privacy Release F/F A11-8 is restored to its non-release state by this signal.

I claim:

1. In a telephone system comprising a plurality of station sets, each including a plurality of finger actuated line select switches,
    (a) multiple adapter units each connected with and proximate to a station set,
    (b) multiple supervisory circuits to each of which at least two of said adapter units are connected via a talk pair and a control pair for each adapter unit, said circuits being remote from said adapter units,
    (c) system control means connected with said supervisory circuits via a data control bus for asynchronously transmitting to each adapter unit, via said supervisory circuits, data including a start pulse causing the adapter to poll the line select and other switches in the station sets, and return the results of said polling to the system control means via the supervisory circuit in the form of a data word, following which the system control means transmits a data word corresponding to light, bell ringing or intercom bell ringing information,
    (d) said system control means including clock means responsive to AC power frequency to produce a timing chain of pulses supplied to logic circuitry for controlling said data transmission and for controlling said supervisory circuits via strobe pulses, said logic circuitry also connected to be responsive to data words returned from the adapter units, the adapter units including other clock means responsive to a start pulse derived from said AC power frequency and used to produce a timing chain of pulses appropriately synchronized with the timing chain of pulses supplied to the system control means, said timing chain of pulses at the adapters being delayed relative to the timing chain pulses at the system control means to facilitate data handling at said adapter units, said delay causing a corresponding delay in said data word return to facilitate data handling at the system control means.

2. The system of claim 1 wherein each of said supervisory circuits includes first means to select a voice pair for a particular adapter unit, second means to send control data to and receive data from said adapter unit via control pair, and to provide light data for a selected line.

3. The system of claim 2 wherein said first means includes a line select register connected with and driving a line select matrix which in turn connects the station set circuit to the desired voice line, each supervisory circuit having a HOLD strobe pulse input responsive to a hold pulse to override loading of data into the line select register.

4. The system of claim 1 including dual line circuitry connected with said system control means, and connectible with a central office or PBX, said circuitry including ring detection means bridged across tip and ring leads from the central office or PBX, and having an output connected with a light data gate characterized in that when said output is coincident with a flash rate signal and a light data enable signal, a data bit is presented to the system control means via the control bus, for causing light data to be transmitted to each adapter via a supervisory circuit.

5. The system of claim 4 wherein said dual line circuitry includes a hold circuit responsive to a hold strobe pulse from said system control means to actuate, corresponding to a hold party condition, the hold circuit including a current detector and a current regulator and being operatively connected with a tip and ring pair, said current detector causing the hold circuit to become reset in response to interruption in central office battery current, thereby to become deactivated, the hold circuit also controlling a light data gate which in turn controls light data transmission to each adapter via a supervisory circuit.

6. The system of claim 4 including a control data bus interconnecting the dual line control circuitry with the system control means and a voice data bus connecting the dual line control circuitry with each of the supervisory circuits.

7. The system of claim 6 wherein said dual line control circuitry includes multiple dual line cards.

8. The system of claim 7 wherein said dual line control circuitry also includes an intercom card.

9. The system of claim 4 including a central cabinet containing said system control means, said supervisory circuits and said dual line control circuitry, the cabinet being remote from said adapter units, said adapter units located proximate said sets, respectively.

10. The system of claim 1 wherein each adapter unit includes a control data transceiver connected with a supervisory circuit via a control pair, and with a station set via multiple wire pairs substantially in excess of three, control logic and a shift register connected with the transceiver to be responsive to a transmit start bit received from the supervisory circuit, a station set switch scanner connected with the station set and with a shift register and transceiver to cause an image of the switch status to be transmitted back to the system control means via a supervisory circuit in response to any closed key switch of the station set, a shift register adapted to receive a data word representing either light or bell information for a particular transmission frame, and a light register connected to receive light data from the shift register in response to reception of a load pulse, the light register connected with light driver means connected with station set lamps, there also being decode circuits connected with the shift register, status switches and a bell driver to effect bell operation in response to ring data transmitted by the shift register.

11. The system of claim 1 including an AC power pair via which each adapter unit is connected to a supervisory circuit.

12. In a telephone system comprising a plurality of station sets, each including a plurality of finger actuated line select switches,
(a) multiple adapter units each connected with and proximate to a station set,
(b) multiple supervisory circuits to which each of said adapter units is connected via a talk pair and a control pair; said circuits being remote from said adapter units,
(c) system control means connected with said supervisory circuits via a data control bus for asynchronously transmitting to each adapter unit, via said supervisory circuits, data including a start pulse causing the adapter to poll the line select and other switches in the station sets, and return the results of said polling to the system control means via the supervisory circuit in the form of a data word, following which the system control means transmits a data word corresponding to light, bell ringing or intercom bell ringing information,
(d) there being one of said line select switches for each line and characterized in that when the same ring data is transmitted to all sets simultaneously, those sets will ring whose line select switches have been switched ON in correspondence to lines associated with said ring data.

* * * * *